(12) United States Patent
Zachary

(10) Patent No.: US 9,016,621 B2
(45) Date of Patent: Apr. 28, 2015

(54) INVERTING WING PROPULSION SYSTEM

(76) Inventor: Kyriacos Mark Zachary, Frankford, DE (US)

( * ) Notice: Subject to any disclaimer, the term of this patent is extended or adjusted under 35 U.S.C. 154(b) by 1580 days.

(21) Appl. No.: 12/312,063

(22) PCT Filed: Oct. 30, 2007

(86) PCT No.: PCT/US2007/082974
§ 371 (c)(1),
(2), (4) Date: Jun. 16, 2010

(87) PCT Pub. No.: WO2008/108892
PCT Pub. Date: Sep. 12, 2008

(65) Prior Publication Data
US 2010/0264262 A1 Oct. 21, 2010

Related U.S. Application Data

(60) Provisional application No. 60/854,958, filed on Oct. 30, 2006.

(51) Int. Cl.
*B64C 33/02* (2006.01)

(52) U.S. Cl.
CPC ................................... *B64C 33/02* (2013.01)

(58) Field of Classification Search
USPC .............................................. 244/11, 22, 72
See application file for complete search history.

(56) References Cited

U.S. PATENT DOCUMENTS

| 6,540,177 | B2 * | 4/2003 | Woo et al. | 244/11 |
|---|---|---|---|---|
| 6,659,397 | B1 * | 12/2003 | Charron | 244/72 |
| 6,783,097 | B1 * | 8/2004 | Smith | 244/72 |
| 6,938,853 | B2 * | 9/2005 | Pines et al. | 244/11 |
| 7,607,610 | B1 * | 10/2009 | Sterchak | 244/72 |
| 7,651,051 | B2 * | 1/2010 | Agrawal et al. | 244/22 |
| 7,963,478 | B2 * | 6/2011 | Kim et al. | 244/22 |
| 8,091,823 | B2 * | 1/2012 | Park et al. | 244/22 |
| 8,181,907 | B2 * | 5/2012 | Smith | 244/72 |
| 8,205,823 | B2 * | 6/2012 | Keennon et al. | 244/22 |
| 8,210,471 | B2 * | 7/2012 | Keennon et al. | 244/22 |
| 8,382,546 | B2 * | 2/2013 | Van Ruymbeke | 446/35 |

\* cited by examiner

*Primary Examiner* — Richard Price, Jr.
(74) *Attorney, Agent, or Firm* — Invention To Patent Services; Alex Hobson

(57) ABSTRACT

An inverting wing propulsion system is disclosed. A vehicle body having a left side and a right side is provided with a wing drive assembly. At least two wings are operatively associated with the wing drive. At least one wing extends from each of the right side and the left side of the body. The wings are adapted to be driven by the wing drive assembly to engage in a reciprocating motion between a raised orientation and a lowered orientation. The reciprocating motion is characterized by a downward arcuate motion, where said wings fully extend from the body so as to generate an upward thrust, and by an upward motion, where the wings are retracted so as to produce reduced, minimized or negligible downward thrust.

13 Claims, 29 Drawing Sheets

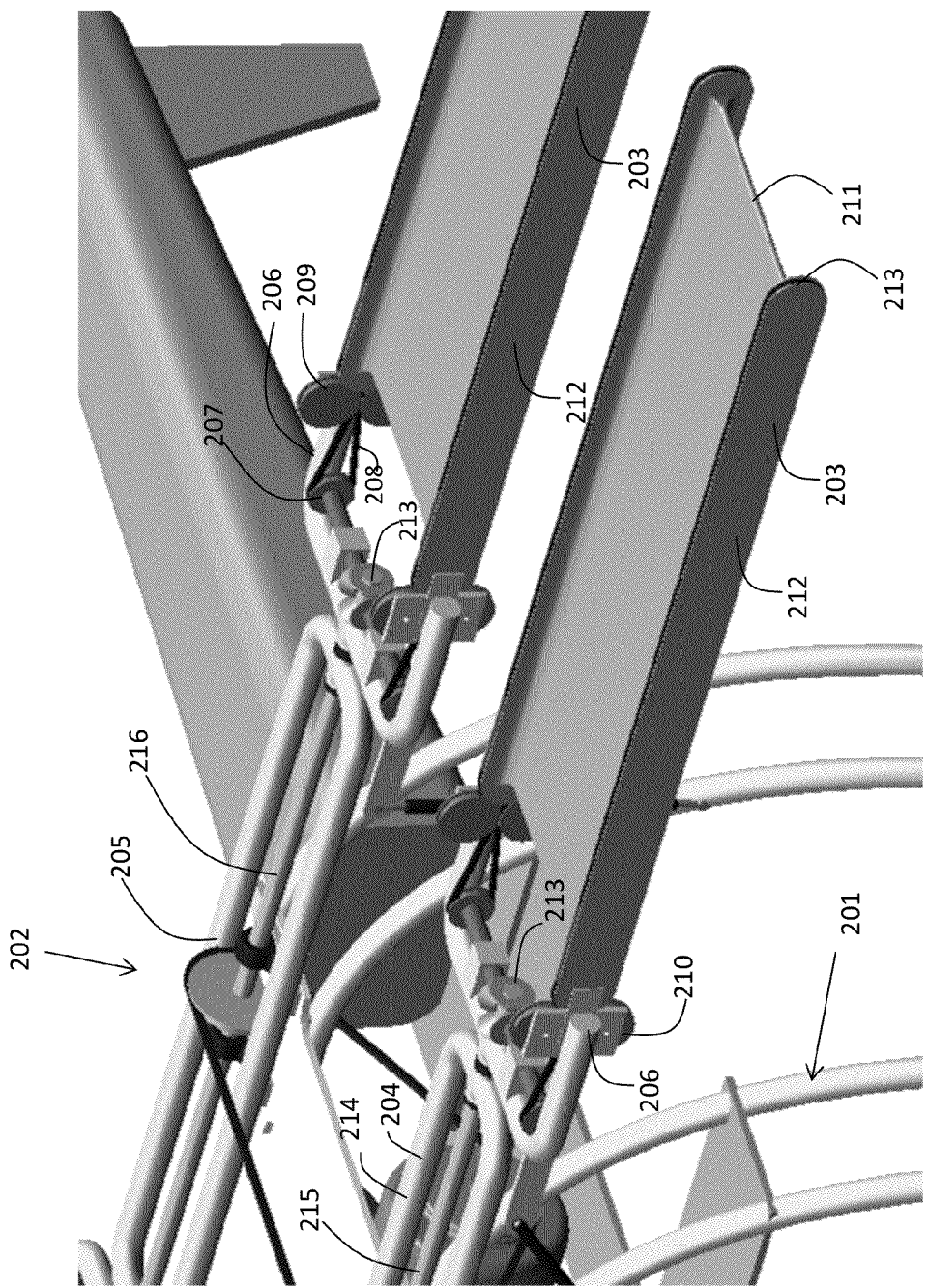

INVERTING WING PROPULSION SYSTEM

CROSS REFERENCE TO RELATED APPLICATION

This application claims priority from U.S. Provisional Patent Application No. 60/854,958, filed Oct. 30, 2006, which is incorporated herein by reference.

BACKGROUND OF THE INVENTION

1. Field of the Invention

The present invention relates to an ornithopter-type propulsion system for a vehicle body that generates thrust by flapping a plurality of wings. More specifically, the present invention relates to an inverting wing propulsion system for a vehicle body that drives a plurality of wings in a reciprocating motion characterized by a downward arcuate motion that generates an upward thrust and by an upward motion that generates a reduced downward thrust.

2. Description of the Related Art

Many attempts have been made to construct aircraft that fly by mimicking the flight motion of birds and insects. Such devices are usually called ornithopters. Typical prior art ornithopters attempt to propel an aircraft by actuating a wing or wings to oscillate in a series of alternating up and down strokes in order to generate thrust, much like a bird or insect will propel itself by stroking its wings.

However, such prior art ornithopters have generally failed to achieve sustained flight or even lift off under their own power. One possible reason for the continuing failure of ornithopter vehicles to achieve flight could be that that the upward thrust generated by the wing or wings of the ornithopter during a downward stroke is negated by the downward thrust generated by the wing or wings during a return upward stroke. That is to say, in a typical prior art ornithopter, the flapping motion of the wing or wings does not operate to generate any net upward thrust on the aircraft, such that the aircraft is never propelled to achieve flight. Accordingly, there is a general need for an ornithopter-type device capable of driving a wing or wings in a downward motion so as to generate an upward thrust, while at the same time returning the wing or wings to a raised orientation in a manner that generates a reduced or minimized downward thrust such that a net upward thrust is generated by the motion of the wing or wings and the aircraft achieves flight.

SUMMARY OF THE INVENTION

It is an object of the present invention to overcome the problems of prior art ornithopter devices by providing a vehicle body having wings attached thereto that engage in a reciprocating motion between raised and lowered orientations characterized by a downward arcuate motion, during which wings fully extend from the vehicle body so as to generate an upward thrust, and an upward motion, during which wings do not fully extend from the vehicle body so as to generate a reduced or minimized downward thrust. For example, with reference to FIG. 3A, wings 303 are flat and would generate almost zero or negligible downward thrust during the upward motion.

It is an object of the present invention to provide an inverting wing propulsion system having a plurality of symmetrically shaped wings that engage in a reciprocating motion between raised and lowered orientations during which wings fully invert, such that during one downward motion one end of each wing extends from a vehicle body and during the next downward motion an opposing end of each wing extends from a vehicle body.

It is an object of the present invention to provide an inverting wing propulsion system, wherein the number and size of the reciprocating wings is only constrained by the relative size of the vehicle body.

It is an object of the present invention to provide an inverting wing propulsion system for propelling a vehicle body to achieve a flight status that eliminates the need for a tail rotor and is more stable than a helicopter.

According to an embodiment of the present invention, a reciprocating wing propulsion system for a body having a right side and a left side is provided. The reciprocating wing propulsion system comprises a wing drive assembly associated with the body and at least two wings operatively associated with the wing drive assembly, at least one wing extending from each of the right side and the left side of the body. The wings are adapted to be driven by the wing drive assembly to engage in a reciprocating motion between a raised orientation and a lowered orientation. The reciprocating motion is characterized by a downward arcuate motion, where said wings fully extend from the body so as to generate an upward thrust, and by an upward motion, where the wings are retracted. Further, the wings have a symmetrical shape. Also, the wings are adapted to fully invert during the reciprocating motion. Finally, the at least two wings are synchronized such that the at least one wing extending from the right side of the body and the at least one wing extending from the left side of the body engage in the downward arcuate motion substantially simultaneously.

According to a further embodiment of the present invention, an inverting wing propulsion system for a body having a right side and a left side is provided. The inverting wing propulsion system comprises a wing drive assembly associated with the body and at least two wings operatively associated with the wing drive assembly, at least one wing extending from each of the right side and the left side of the body. The wings are adapted to be driven by the wing drive assembly to engage in a reciprocating motion between a raised orientation and a lowered orientation. The reciprocating motion is characterized by a downward arcuate motion, during which the wings fully extend from the body so as to generate an upward thrust, and by an upward vertical motion, during which the wings are retracted. The wings fully invert during the reciprocating motion. Further, the wings have a symmetrical shape. Also, the at least two wings are synchronized such that the at least one wing extending from the right side of the body and the at least one wing extending from the left side of the body engage in the downward arcuate motion substantially simultaneously.

According to a further embodiment of the present invention, the at least two wings each comprise a tubular structure having two opposing long flat sides and two opposing short rounded sides. The body further comprises a top side and at least one cross member disposed on the top side, the at least one cross member extending from the left side to the right side of the body and having a left end and a right end. The wing drive assembly comprises a motor disposed in the body, a cross member gear disposed within the at least one cross member, the cross member gear being adapted to be driven by the motor, and wing holding frames attached to each of the right end and the left end of the at least one cross member. Each of the wing holding frames comprises a gear structure disposed on the wing holding frame, the gear structure being adapted to be driven by the motor via the cross member gear, a drive roller disposed on the wing holding frame, the drive roller being adapted to be driven in a rotational direction by the motor via the cross member gear and the gear structure, and a wing roller disposed on the wing holding frame proximate to the drive roller, the wing roller being adapted to be driven in a rotational direction opposite to the rotational direction of the drive roller. The wing roller passes through one of the at least two tubular wings such that the tubular wing is attached to the wing holding frame by being disposed between and engaging the drive roller and the wing roller. The tubular wing is driven to engage in the reciprocating motion by the opposing rotations of the drive roller and the wing roller.

According to an alternate embodiment of the present invention, an inner surface of the tubular wing and an outer surface of the wing roller both comprise teeth. The teeth on the tubular wing and the teeth on the wing roller engage each other to prevent slippage of the tubular wing with respect to the wing roller during the reciprocating motion.

According to a further embodiment of the present invention, the at least two wings each comprise a flat planar portion having two opposing long sides and two opposing short sides, flange portions disposed on each of the two opposing long sides of the flat planar portion and co-extending therewith, the flange portions being oriented orthogonally to the flat planar portion, the flange portions each having two opposing long flat sides and two opposing short rounded sides defining a perimeter of each of the flange portions, and channels disposed within each of the flange portions, the channels extending along an entire perimeter of the flange portions. The body further comprises a top side and at least one cross member disposed on the top side, the at least one cross member extending from the left side to the right side of said body and having a left end and a right end. The wing drive assembly comprises a motor disposed in the body, a cross member gear disposed within the at least one cross member, the cross member gear being adapted to be driven by the motor, and wing holding frames attached to each of the right end and the left end of the at least one cross member. Each of the wing holding frames comprises a gear structure disposed on the wing holding frame, the gear structure being adapted to be driven by the motor via the cross member gear, two drive pulleys disposed on opposing sides of the gear structure, the drive pulleys being adapted to be driven in a rotational direction by the motor via the cross member gear and the gear structure, two upper guide pulleys disposed on the wing holding frame, each of the upper guide pulleys being associated with one of the drive pulleys, two lower guide pulleys disposed on the wing holding frame, each of the lower guide pulleys being associated with one of the drive pulleys and being positioned on the wing holding frame proximate to one of the upper guide pulleys, and two belts, each of the belts being disposed around one of the drive pulleys and around one of the flange portions of the wing within the channel, each of the belts further engaging one of the upper guide pulleys and one of the lower guide pulleys. One of the at least two wings is attached to the wing holding frame proximate to the upper and lower guide pulleys by the belts. The belts are driven in the rotational direction by the drive pulleys and guided by the upper and lower guide pulleys so as to drive the wing in the reciprocating motion.

According to an alternate embodiment of the present invention, outer surfaces of the drive pulleys, inner surfaces of the belts, and bottom surfaces of the channels disposed within the flange portions of the wing all comprise teeth. The teeth on the outer surfaces of the drive pulleys and the inner surfaces of the belts engage each other to prevent slippage of the belts with respect to the drive pulleys as the belts are being driven by the drive pulleys. The teeth on the inner surfaces of the belts and the bottom surfaces of the channels engage each other to prevent slippage of the wing with respect to the belts during the reciprocating motion.

According to a further embodiment of the present invention, the at least two wings each comprise a flat planar structure having two opposing long sides and two opposing short sides. The body further comprises a top side and at least one cross member disposed on the top side, the at least one cross member extending from the left side to the right side of the body and having a left end and a right end. The wing drive assembly comprises a motor disposed in the body, a cross member gear disposed within the at least one cross member, the cross member gear being adapted to be driven by the motor, and wing holding frames attached to each of the right end and the left end of the at least one cross member. Each of the wing holding frames comprises a gear structure disposed on the wing holding frame, the gear structure being adapted to be driven by the motor via the cross member gear, two drive discs disposed on opposing sides of the wing holding frame, the drive discs being adapted to be driven in a rotational direction by the motor via the cross member gear and the gear structure, and cam tracks disposed on opposing sides of the wing holding frame. Each of the drive discs comprises a proximal surface and a distal surface, two inversion gears disposed on the proximal surface of the drive disc, the inversion gears being adapted to engage one another such that the inversion gears rotate in opposing rotational directions, wing inversion discs disposed on each of the inversion gears such that the inversion gears are disposed between the inversion discs and the proximal surface of the drive disc, and two cam mechanisms disposed on the distal surface of the drive disc, each of the cam mechanisms being adapted to actuate the inversion gears to rotate in opposing rotational directions. Each of the cam tracks is adapted to engage the cam mechanisms on the drive discs. One of the at least two wings is attached to the wing holding frame by being disposed between and engaging the wing inversion discs on each of the drive discs. The drive discs engage the wing via the wing inversion discs so as to drive the wing through the downward arcuate motion. The wing inversion discs engage the wing so as to drive the wing through the upward vertical motion when the cam mechanisms engage the cam tracks and actuate the inversion gears to rotate in opposing rotational directions.

The cam mechanisms are arranged on the distal surfaces of the drive discs so as to engage the cam tracks before the downward arcuate motion of the wing is completed, whereby the wing is withdrawn from the fully extended position and driven in an indexed upward motion prior to reaching a vertical lowered orientation.

According to an alternate embodiment of the present invention, circumferential surfaces of the wing inversion discs and an outer surface of the wing comprise teeth. The teeth on the circumferential surfaces of the wing inversion discs and the outer surface of the wing engage each other to prevent slippage of the wing with respect to the wing inversion discs during the reciprocating motion.

According to a further embodiment of the present invention, four wings are operatively associated with the wing drive assembly, two wings extending from each of the right side and the left side of the body. The four wings are staggered as they engage in a synchronized reciprocating motion such that as two wings are driven through the downward arcuate motion, two wings are driven through the upward vertical motion.

In another aspect of the present invention, a method of providing upward vertical thrust to a body, the body having a right side and a left side, is provided. The method comprises the steps of (a) providing a wing drive assembly associated with the body; (b) providing at least two wings operatively associated with the wing drive assembly, at least one wing extending from each of the right side and the left side of the body; (c) driving the wings from a raised orientation to a lowered orientation by a downward arcuate motion, the wings fully extending from the body during said downward arcuate motion so as to generate an upward thrust; (d) driving the wings from a lowered orientation to a raised orientation by an upward motion, the wings being retracted during the upward motion; and (e) repeating steps (c) and (d).

Further details and advantages of the invention will become clear upon reading the following detailed description in conjunction with the accompanying drawing figures, wherein like parts are designated with like reference numerals throughout.

BRIEF DESCRIPTION OF THE DRAWINGS

FIG. 2B depicts a detailed perspective view of a wing drive assembly and wings according to an embodiment of the present invention.

DETAILED DESCRIPTION OF THE PREFERRED EMBODIMENTS

For purposes of the description hereinafter, spatial orientation terms, if used, shall relate to the referenced embodiment as it is oriented in the accompanying drawing figures or otherwise described in the following detailed description. However, it is to be understood that the embodiments described hereinafter may assume many alternative variations and embodiments. It is also to be understood that the specific devices illustrated in the accompanying drawing figures and described herein are simply exemplary and should not be considered as limiting.

FIGS. 1A-1F depict an inverting wing propulsion system 100 according to an embodiment of the present invention.

Figure 1A:
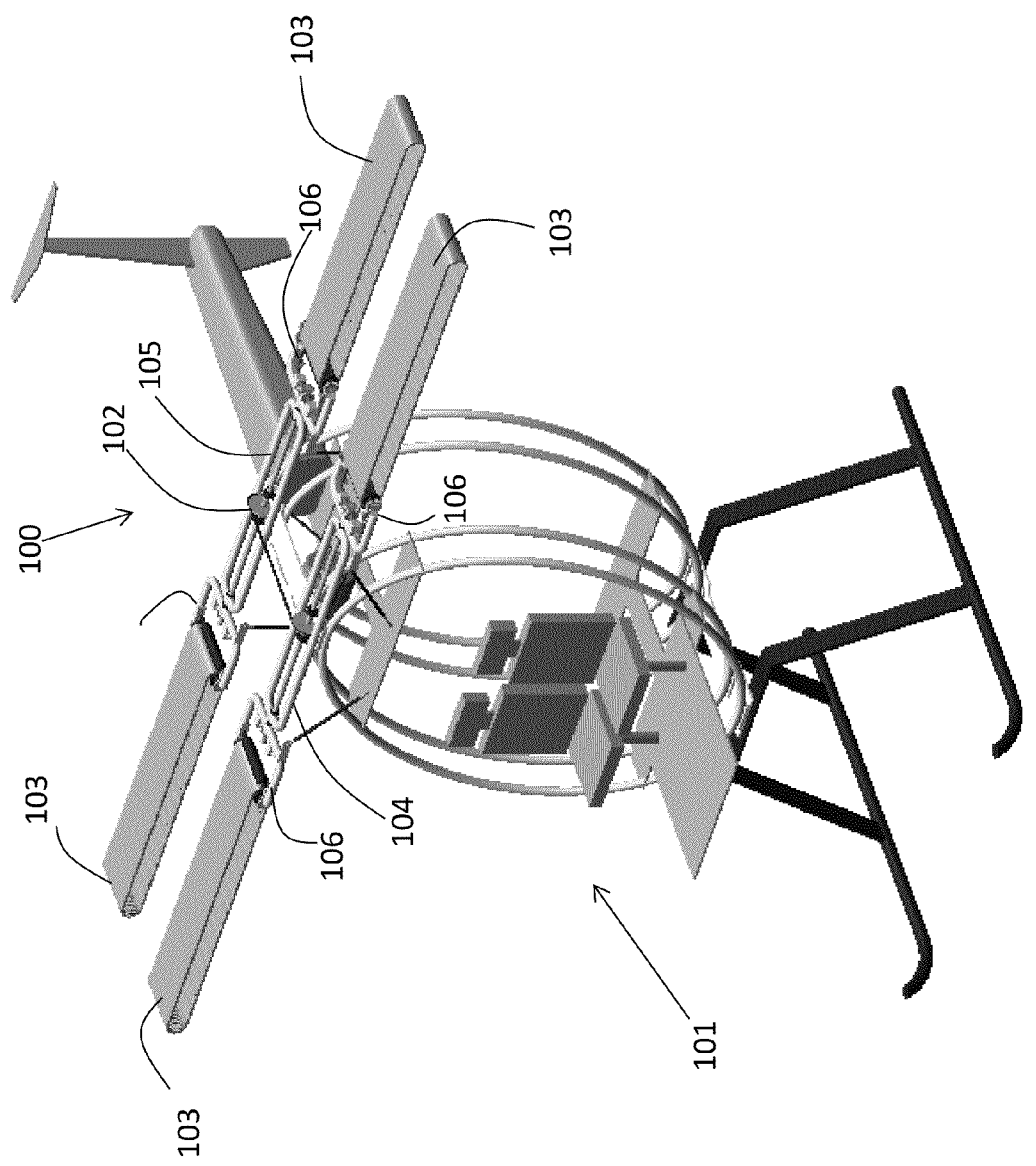
FIG. 1A depicts a perspective view of a vehicle body having an inverting wing propulsion system according to an embodiment of the present invention.

With reference to FIG. 1A, a vehicle body 101 is provided with a wing drive assembly 102 for driving wings 103 to engage in a reciprocating motion. Vehicle body 101 has a left side, a right side and a top side. The wing drive assembly 102 is associated with the top side of body 101.

As shown, four wings 103 are operatively associated with the wing drive assembly 102 so as to be driven in the reciprocating motion. Two wings 103 extend from each of the right side and the left side of the body 101. Front 104 and rear 105 cross members extend across the top of body 101 from left to right. Attached to each end of the front 104 and rear 105 cross members are U-shaped wing holding frames 106, which attach wings 103 to body 101 and operatively associate the wings 103 with the wing drive assembly 102 as will be described below. Wings 103 have a symmetrical tubular structure with two opposing long flat sides and two opposing short rounded sides.

Figure 1B:
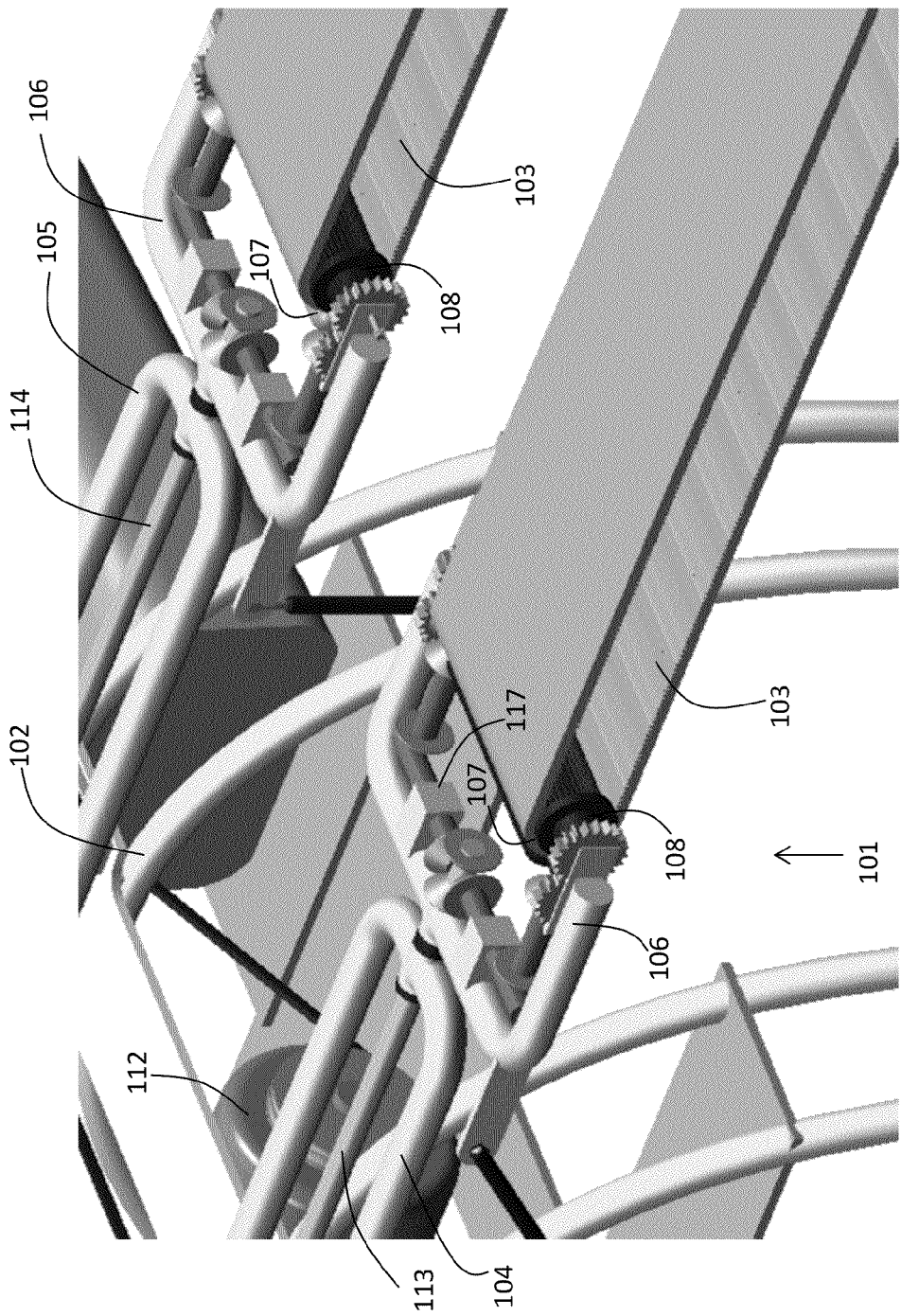
FIG. 1B depicts a detailed perspective view of a wing drive assembly and wings according to an embodiment of the present invention.

With reference to FIG. 1B, a detailed perspective view of the wing drive assembly 102 and wings 103 is shown. A motor 112 is disposed in vehicle body 101 proximate to a top side thereof. Front 113 and rear 114 cross member gears are disposed within front 104 and rear 105 cross members, respectively, and co-extend therewith. Front 113 and rear 114 cross member gears extend through wing holding frames 106 disposed on either side of front 104 and rear 105 cross members so as to engage gear structures 117 disposed on the wing holding frames 106. Gear structures 117 in turn engage both sides of drive rollers 107 disposed on the wing holding frames 106.

Drive roller gears 109 are disposed on either side of the drive rollers 107. Drive roller gears 109 engage wing roller gears 110 disposed on either side of wing rollers 108 disposed on wing holding frames 106. Wings 103 are attached to wing holding frames 106 by passing wing rollers 108 through the tubular structures of wings 103. Drive rollers 107 and wing rollers 108 are disposed in proximate positions such that wings 103 are disposed between and engaged by both drive rollers 107 and wing rollers 108.

Figure 1C:
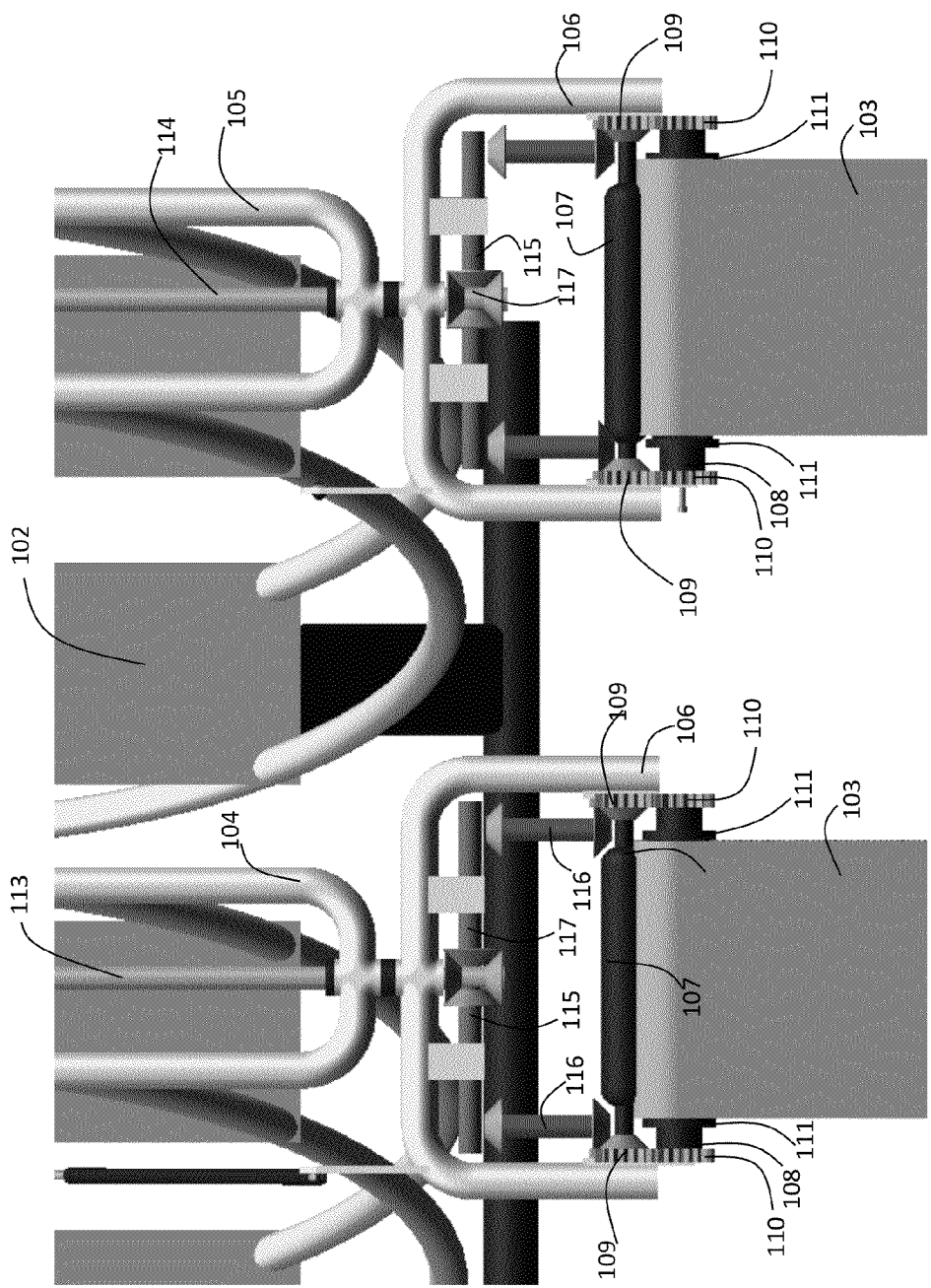
FIG. 1C depicts a top view of the wing drive assembly and wings according to an embodiment of the present invention.

With reference to FIG. 1C, a detailed top view of wing drive assembly 102 and wings 103 is shown. Front 113 and rear 114 cross member gears extend from front 104 and rear 105 cross members and through wing holding frames 106 to engage the gear structures 117 disposed on the wing holding frames 106. Front 113 and rear 114 cross member gears engage first gears 115 of gear structures 117, extending in both directions along longitudinal sides of U-shaped wing holding frames 106. First gears 115 in turn engage second gears 116 of gear structures 117, extending along opposing transverse sides of U-shaped wing holding frames 106. Second gears 116 engage both sides of drive rollers 107. Wings 103 are disposed between and engage both drive rollers 107 and wing rollers 108. Wing holding flanges 111 disposed on wing rollers 108 prevent longitudinal movement of wings 103 along the wing rollers 108.

Operation of the inverting wing propulsion system according to an embodiment of the present invention will now be described with reference to FIGS. 1B and 1C. Motor 112 engages front 113 and rear 114 cross member gears so as to drive front 113 and rear 114 cross member gears to rotate in a manner to be described below with respect to FIG. 4. As front 113 and rear 114 cross member gears rotate, they actuate first gears 115 of gear structures 117 to rotate as well. First gears 115, in turn, actuate second gears 116 of gear structures 117 to rotate. Second gears 116 actuate drive rollers 107 to rotate in a rotational direction.

As drive rollers 107 rotate in the rotational direction, drive roller gears 109 rotate in the same rotational direction. Drive roller gears 109 actuate wing roller gears 110 to rotate in an opposing rotational direction, which causes wing rollers 108 to rotate in an opposing rotational direction to the rotational direction of drive rollers 107. As drive rollers 107 and wing rollers 108 rotate in opposing rotational directions, the tubular structures of wings 103 are caused to pass between the drive rollers 107 and wing rollers 108. Wings 103 are thereby driven to engage in a reciprocating motion between a raised orientation and a lowered orientation.

Figure 1D:
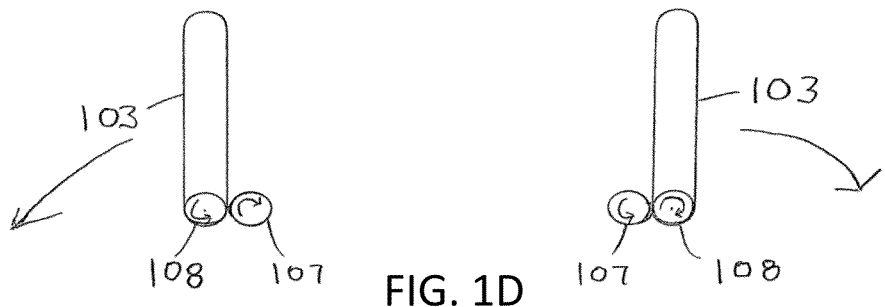
FIG. 1D depicts a schematic illustration of the inverting wing propulsion system according to an embodiment of the present invention with the wings in an initial, raised, orientation.
Figure 1E:
FIG. 1E depicts a schematic illustration of the inverting wing propulsion system according to an embodiment of the present invention with the wings being driven in a downward arcuate motion.
Figure 1F:
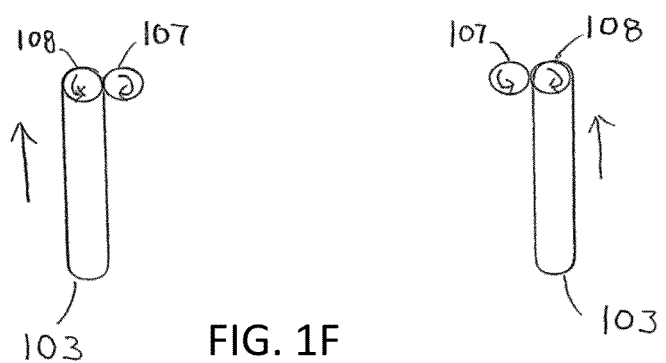
FIG. 1F depicts a schematic illustration of the inverting wing propulsion system according to an embodiment of the present invention with the wings in a fully lowered orientation.

With reference to FIGS. 1D-1F, the reciprocating motion of wings 103 begins with wings 103 being oriented in a raised vertical orientation as shown in FIG. 1D. The drive rollers 107 and wing rollers 108 engage one of the opposing short rounded sides of wings 103 so as to cause wings 103 to engage in a downward arcuate motion with wing rollers 108 acting as pivot points, as shown in FIG. 1E. Wings 103 are synchronized such that they engaged in the downward arcuate motion at nearly the same time, as shown in FIG. 1E.

During the downward arcuate motion, wings 103 fully extend from body 101 across a substantially entire length of wings 103 so as to generate an upward thrust. The downward arcuate motion of wings 103 is ended when one of the opposing short rounded sides of the tubular structure of each wing 103 completely passes between drive rollers 107 and wing rollers 108 and wings 103 become oriented in a lowered vertical orientation, as shown in FIG. 1F.

Drive rollers 107 and wing rollers 108 then engage one of the opposing long flat sides of the tubular structure of each wing 103 such that wings 103 become retracted with respect to body 101 and are raised in a vertical direction from the lowered orientation to the raised orientation as one of the opposing long flat sides of the tubular structure of each wing 103 passes between drive rollers 107 and wing rollers 108 so as to generate a minimized downward thrust. As can be appreciated from FIGS. 1D-1F, wings 103 fully invert during the reciprocating motion as alternating short rounded sides and long flat sides of the tubular structures of wings 103 pass between drive rollers 107 and wing rollers 108.

Figure 1G:
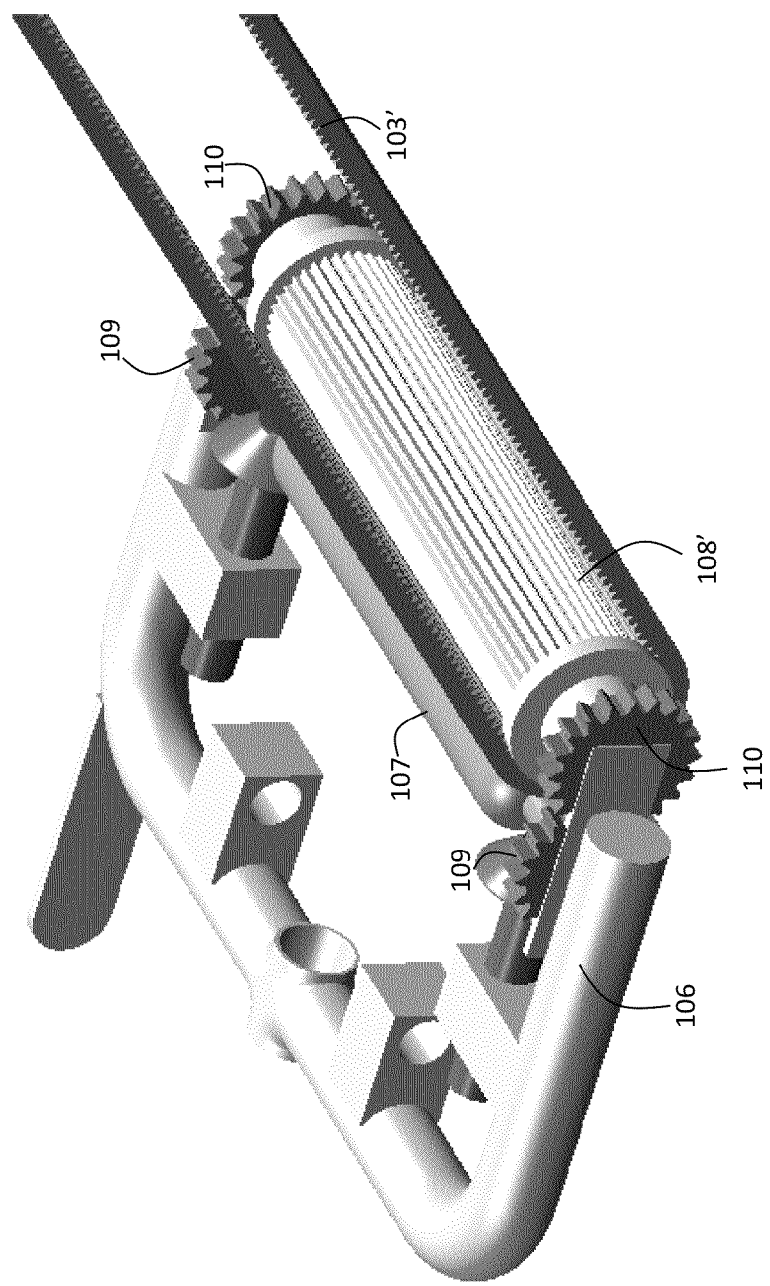
FIG. 1G depicts a detailed top perspective view of a wing drive assembly and wing according to an embodiment of the present invention.
Figure 1H:
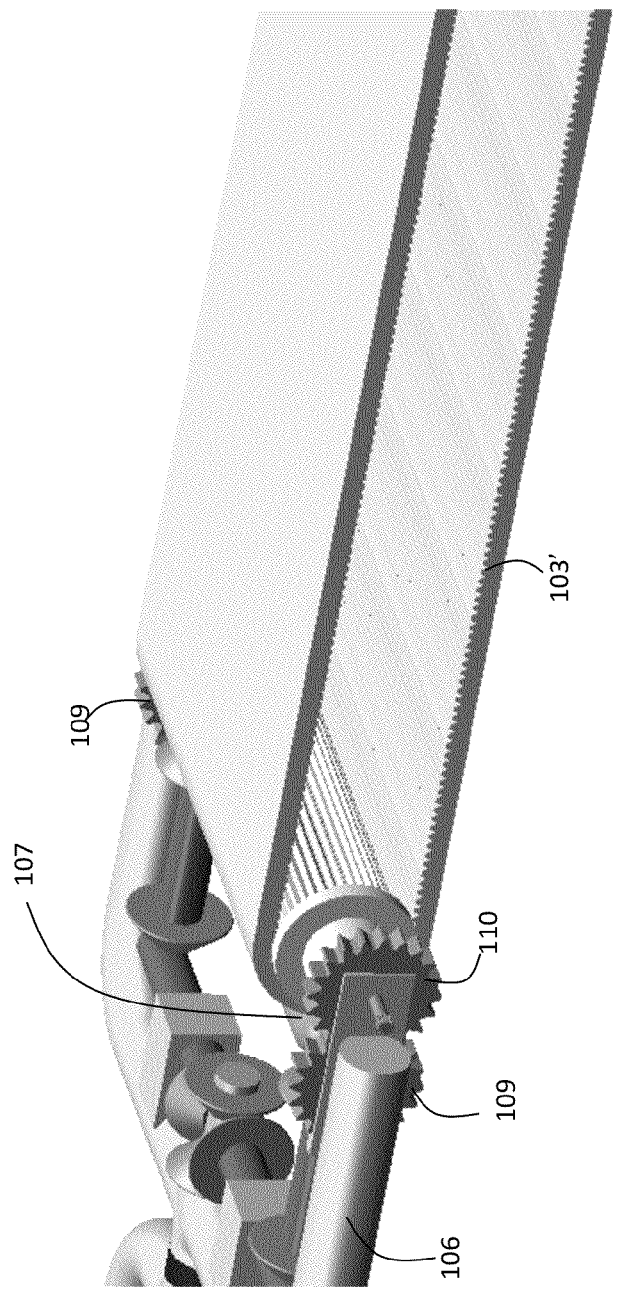
FIG. 1H depicts a detailed side perspective view of a wing drive assembly and wing according to an embodiment of the present invention.

With reference to FIGS. 1G and 1H, an alternate embodiment of the embodiment of FIGS. 1A-1F is shown. As shown in FIG. 1G, wing roller 108' has a plurality of teeth disposed on an outer surface thereof. As shown in FIG. 1H, wing 103' has a plurality of teeth disposed on an inner surface of the tubular structure of the wing 103'. Teeth on the outer surface of wing roller 108' and inner surface of wing 103' engage each other in order to prevent the wing 103' from slipping with respect to wing roller 108' as the wing engages in the reciprocating motion. Prevention of slippage between wing 103' and wing roller 108' helps to ensure that wings 103' reciprocate in a uniform manner.

Figure 2A:
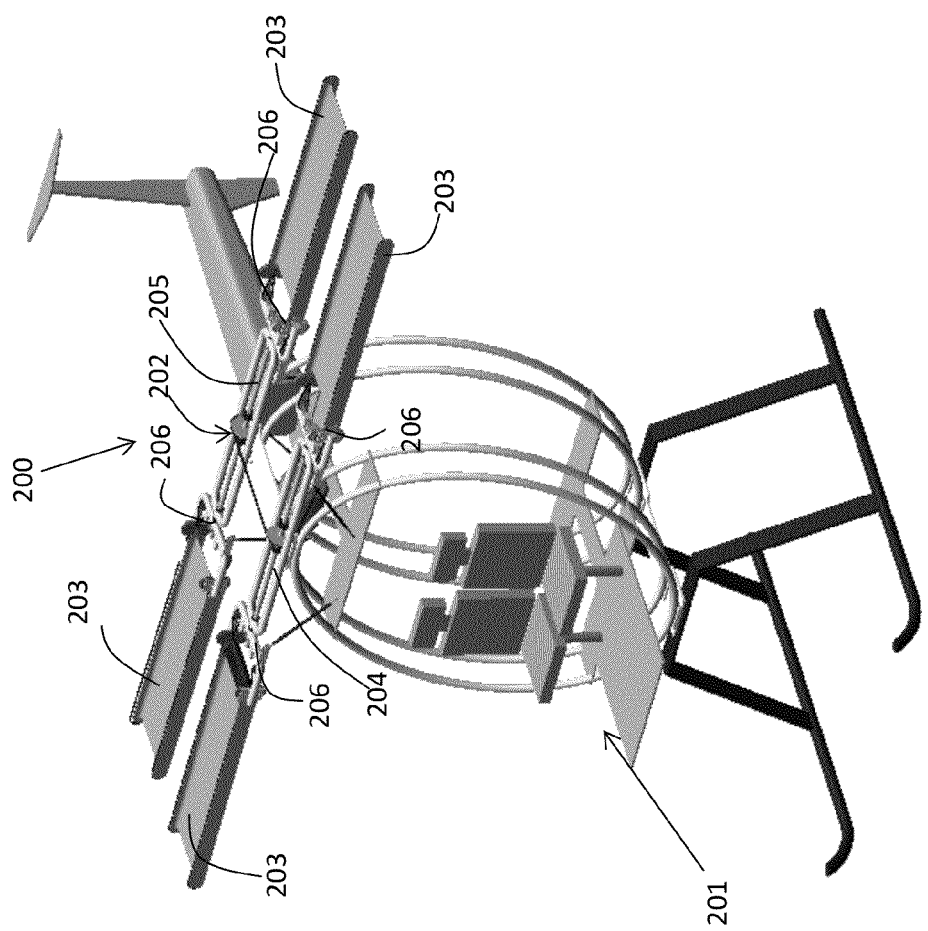
FIG. 2A depicts a perspective view of a vehicle body having an inverting wing propulsion system according to an embodiment of the present invention.

FIGS. 2A-2F depict an inverting wing propulsion system 200 according to an embodiment of the present invention. With reference to FIG. 2A, a vehicle body 201 is provided with a wing drive assembly 202 for driving wings 203 to engage in a reciprocating motion. Vehicle body 201 has a left side, a right side and a top side. The wing drive assembly 202 is associated with the top side of body 201.

As shown, four wings 203 are operatively associated with the wing drive assembly 202 so as to be driven in the reciprocating motion. Two wings 203 extend from each of the right side and the left side of the body 201. Front 204 and rear 205 cross members extend across the top of body 201 from left to right. Attached to each end of the front 204 and rear 205 cross members are U-shaped wing holding frames 206, which attach wings 203 to body 201 and operatively associate the wings 203 with the wing drive assembly 202 as will be described below.

With reference to FIG. 2B, a detailed perspective view of the wing drive assembly 202 and wings 203 is shown. Wings 203 have a symmetrical structure characterized by a flat planar portion 211 having two opposing long sides and two opposing short sides. Flange portions 212 are disposed on and co-extend with each of the long sides of flat planar portion 211. Flange portions 212 are disposed on flat portion 211 so as to be oriented orthogonally to the flat planar portion 211. Each flange portion 212 has two opposing short rounded sides and two opposing long flat sides, which define a perimeter of the flange portion 212. A channel 213 having a bottom surface is disposed in each flange portion 212 and extends along an entire perimeter of the flange portion 212.

A motor 214 is disposed in vehicle body 201 proximate to a top side thereof. Front 215 and rear 216 cross member gears are disposed within front 204 and rear 205 cross members, respectively, and co-extend therewith. Front 215 and rear 216 cross member gears extend through wing holding frames 206 disposed on either side of front 204 and rear 205 cross members so as to engage gear structures 218 disposed on the wing holding frames 206. Gear structures 218 in turn engage drive pulleys 207 disposed on each end of gear structures 218.

Figure 2C:
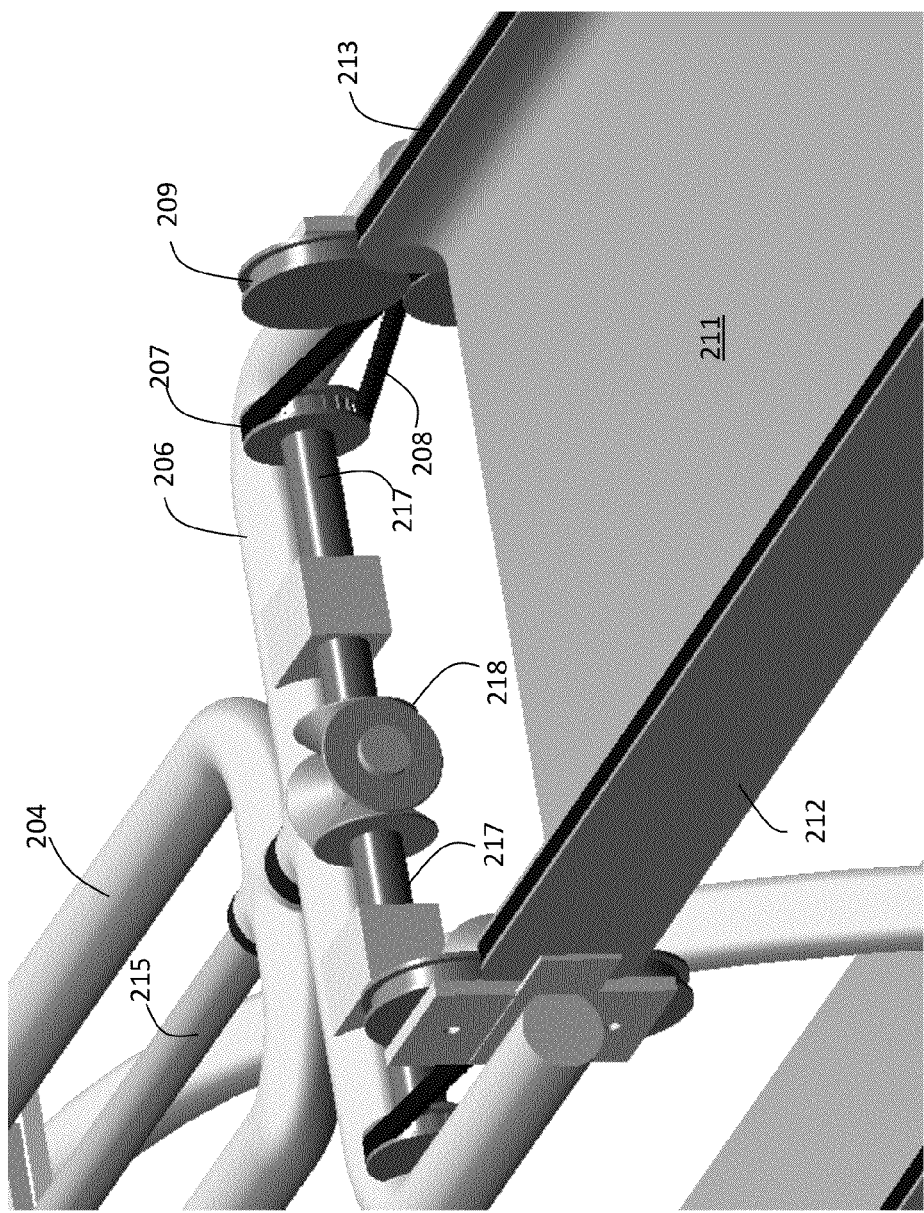
FIG. 2C depicts a detailed perspective view of a wing drive assembly and wing according to an embodiment of the present invention.

With reference to FIG. 2C, a detailed perspective view of the wing drive assembly 202 and a wing 203 is shown. Front cross member gear 215 extends from front cross member 204 through wing holding frame 206 to engage first gears 217 of gear structure 218, extending along a longitudinal side of U-shaped wing holding frame 206. Drive pulleys 207 are disposed at each end of first gear 217 opposite to front cross member gear 215. An upper guide pulley 209 and a lower guide pulley 210 are disposed proximate to one another on each transverse side of U-shaped wing holding frame 206.

Belts 208 are disposed around drive pulleys 207 and around the perimeters of flange portions 212 of wing 203 within channels so as to engage drive pulleys 207 and wing 203 and attach wing 203 to wing holding frame 206, as shown in FIG. 2B. Belts 208 pass between upper 209 and lower 210 guide pulleys. Wing 203 is attached to wing holding frame 206 by belts 208 so as to be located proximate to and engage upper 209 and lower 210 guide pulleys.

Operation of the inverting wing propulsion system according to an embodiment of the present invention will now be described with reference to FIGS. 2B and 2C. Motor 214 engages front 215 and rear 216 cross member gears so as to drive front 215 and rear 216 cross member gears to rotate in a manner to be described below with respect to FIG. 4. As front 215 and rear 216 cross member gears rotate, they actuate first gears 217 of gear structures 218 to rotate as well. Drive pulleys 207 rotate along with first gears 217. As drive pulleys 207 rotate they engage belts 208 to move along a path around drive pulleys 207, below upper guide pulleys 209, into channels 213 and around flange portions 212 of wing 203, above lower guide pulleys 210 and back to drive pulleys 207. Wing 203 is thereby driven to engage in a reciprocating motion between a raised orientation and a lowered orientation.

Figure 2D:
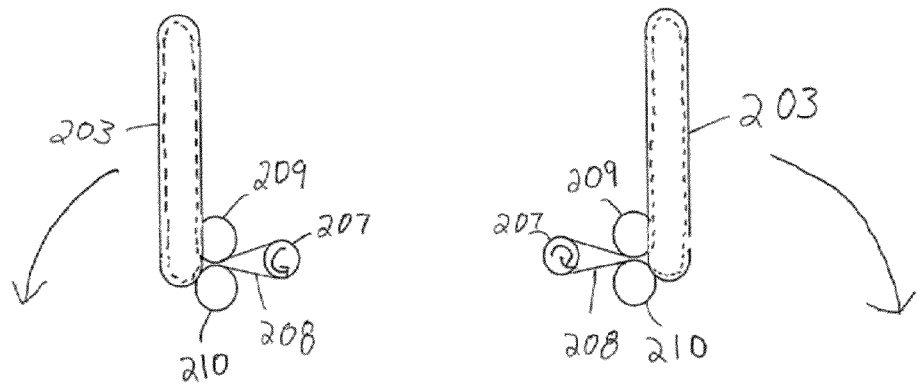
FIG. 2D depicts a schematic illustration of the inverting wing propulsion system according to an embodiment of the present invention with the wings in an initial, raised, orientation.
Figure 2E:
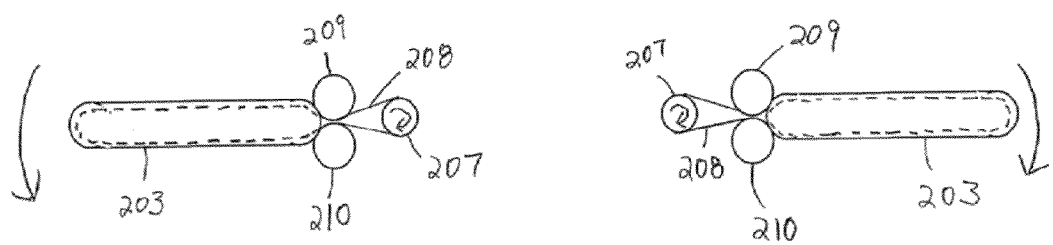
FIG. 2E depicts a schematic illustration of the inverting wing propulsion system according to an embodiment of the present invention with the wings being driven in a downward arcuate motion.
Figure 2F:
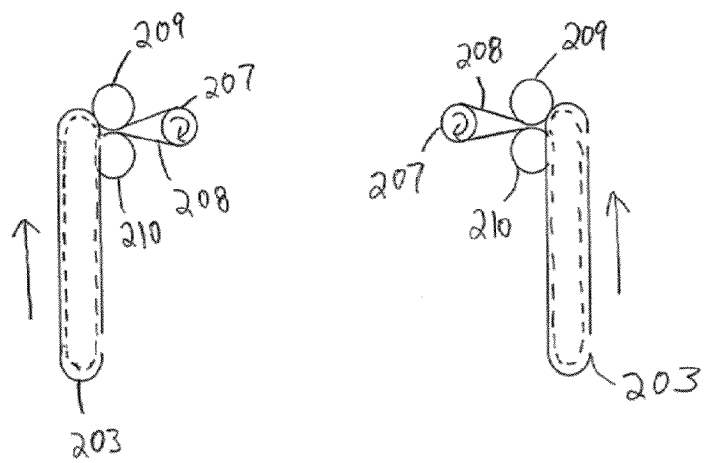
FIG. 2F depicts a schematic illustration of the inverting wing propulsion system according to an embodiment of the present invention with the wings in a fully lowered orientation.

With reference to FIGS. 2D-2F, the reciprocating motion of wings 203 begins with wings 203 being oriented in a raised vertical orientation as shown in FIG. 2D. The path of belts 208 within channels 213 about flange portions 212 of wings 203 is generally noted by a dashed line in FIGS. 2D-2F. The drive pulleys 207 engage belts 208 to move along the above-mentioned path so as to pull wings 203 through a downward arcuate motion with an area of engagement between one of the opposing short rounded sides of flange portions 212 and upper 209 and lower 210 guide pulleys acting as pivot points as shown in FIG. 2E. Wings 203 are synchronized such that they engaged in the downward arcuate motion at nearly the same time, as shown in FIG. 2E.

During the downward arcuate motion, wings 203 fully extend from body 201 across a substantially entire length of wings 203 so as to generate an upward thrust. The downward arcuate motion of wings 203 is ended when wings 203 reach a lowered vertical orientation and belts 208 begin to pull wings 203 in an upward vertical direction as shown in FIG. 2F. Belts 208 pull wings 203 from the lowered vertical orientation to the raised vertical orientation in an upward vertical direction so as to generate a minimized downward thrust. During this upward vertical motion wings 203 become retracted with respect to body 201. As can be appreciated from FIGS. 2D-2F, wings 203 fully invert during the reciprocating motion as alternating short rounded sides and long flat sides of flange portions 212 of wings 203 become oriented so as to engage upper 209 and lower 210 guide pulleys.

Figure 2G:
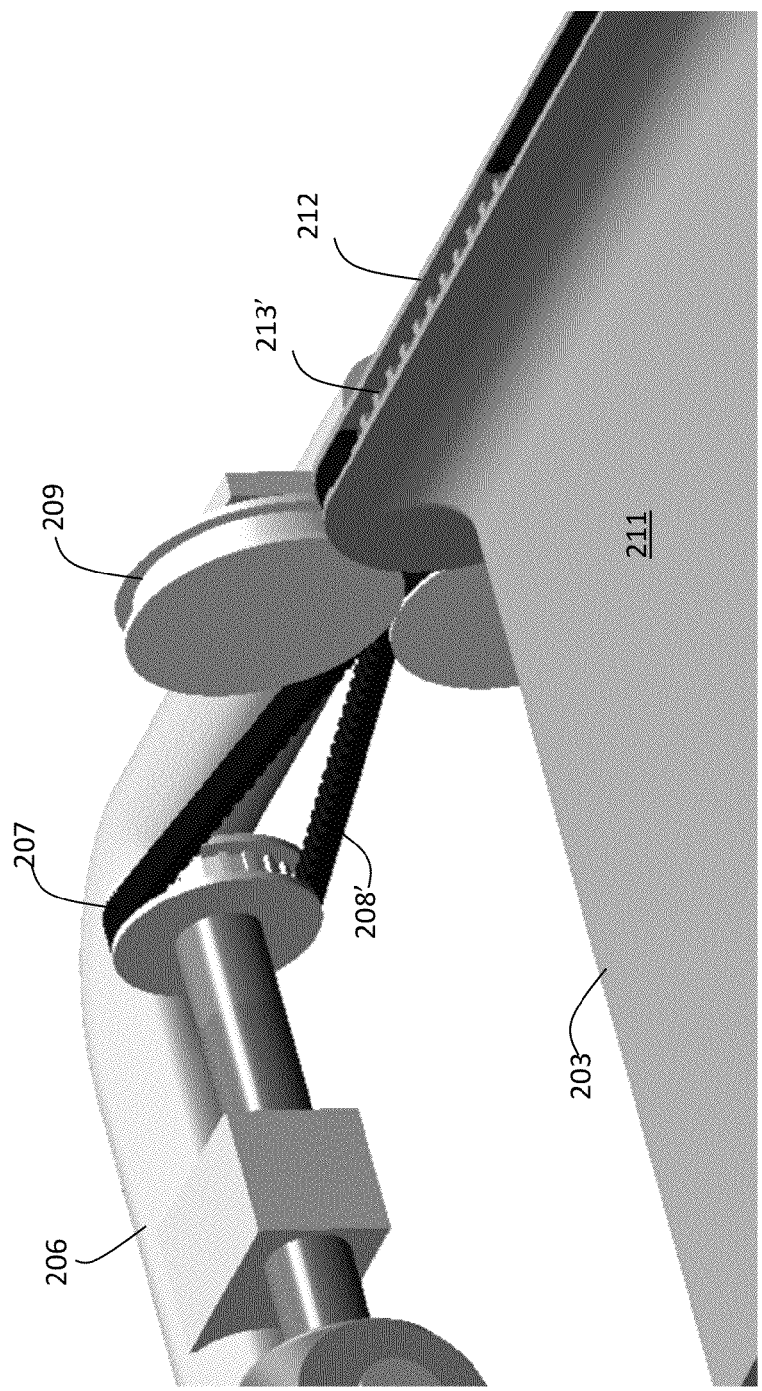
FIG. 2G depicts a detailed perspective view of a wing drive assembly and wing according to an embodiment of the present invention.

With reference to FIG. 2G, an alternate embodiment of the embodiment of FIGS. 2A-2F is shown. As shown in FIG. 2G, drive pulley 207' has a plurality of teeth disposed on an outer surface thereof, belt 208' has a plurality of teeth disposed on an inner surface thereof, and channel 213' about the perimeter of flange portion 212 of wing 203' has teeth disposed on a bottom surface thereof. Teeth on the outer surface of drive pulley 207' and inner surface of belt 208' engage each other in order to prevent belt 208' from slipping with respect to drive pulley 207' as the belt 208' is driven by drive pulley 207'. Teeth on the inner surface of belt 208' and bottom surface of channel 213' engage each other in order to prevent wing 203' from slipping with respect to belt 208' as the wing engages in the reciprocating motion. Prevention of slippage between belt 208' and drive pulley 207', as well as between wing 203' and belt 208', helps to ensure that wings 203' reciprocate in a uniform manner.

Figure 3A:
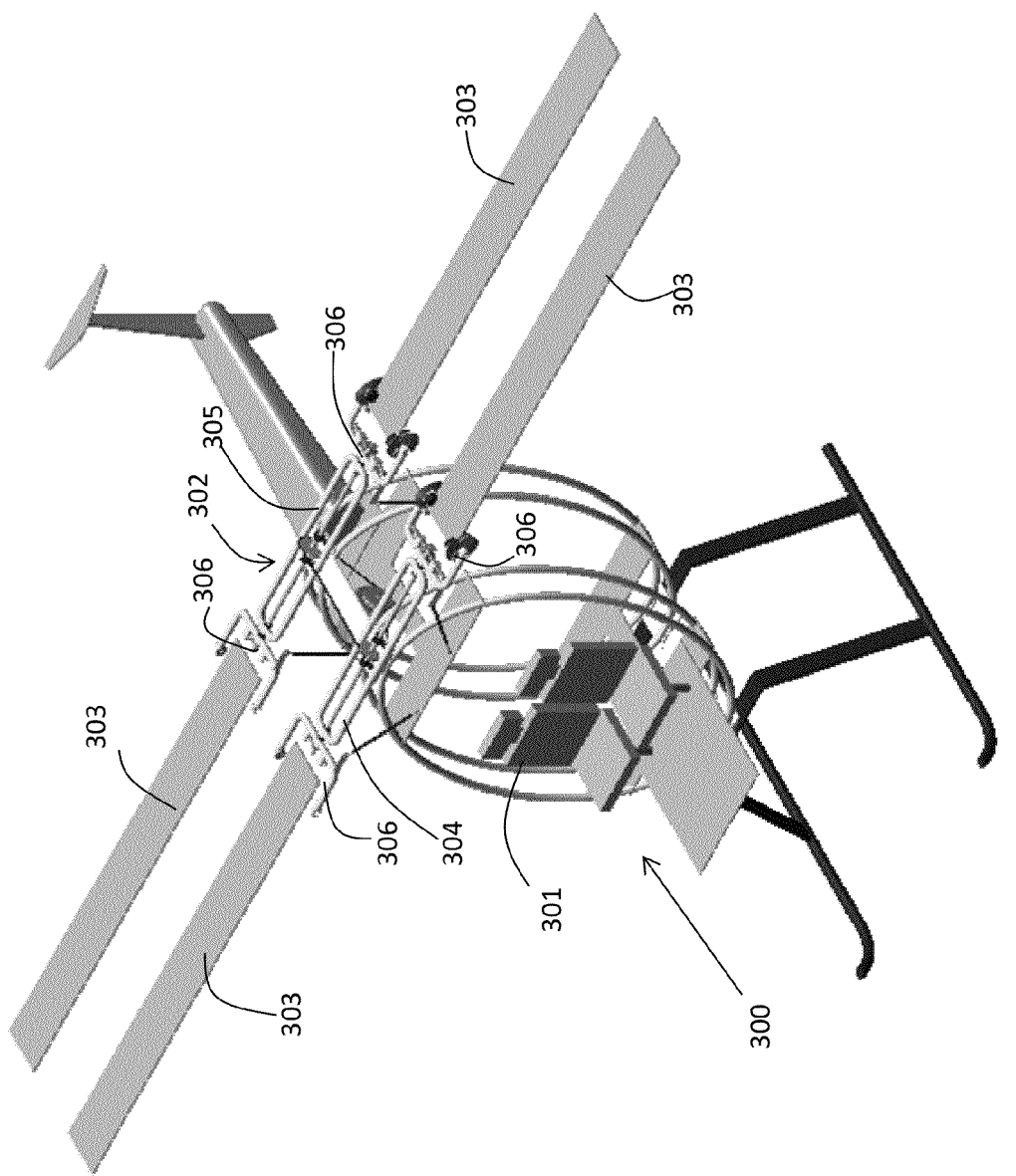
FIG. 3A depicts a perspective view of a vehicle body having an inverting wing propulsion system according to an embodiment of the present invention.

FIGS. 3A-3H depict an inverting wing propulsion system 300 according to an embodiment of the present invention. With reference to FIG. 3A, a vehicle body 301 is provided with a wing drive assembly 302 for driving wings 303 to engage in a reciprocating motion. Vehicle body 301 has a left side, a right side and a top side. The wing drive assembly 302 is associated with the top side of body 301. As shown, four wings 303 are operatively associated with the wing drive assembly 302 so as to be driven in the reciprocating motion. Two wings 303 extend from each of the right side and the left side of the body 301. Front 304 and rear 305 cross members extend across the top of body 301 from left to right.

Attached to each end of the front 304 and rear 305 cross members are U-shaped wing holding frames 306, which attach wings 303 to body 301 and operatively associate the wings 303 with the wing drive assembly 302 as will be described below. Wings 303 have a symmetrical flat planar structure with two opposing long sides and two opposing short sides.

Figure 3B:
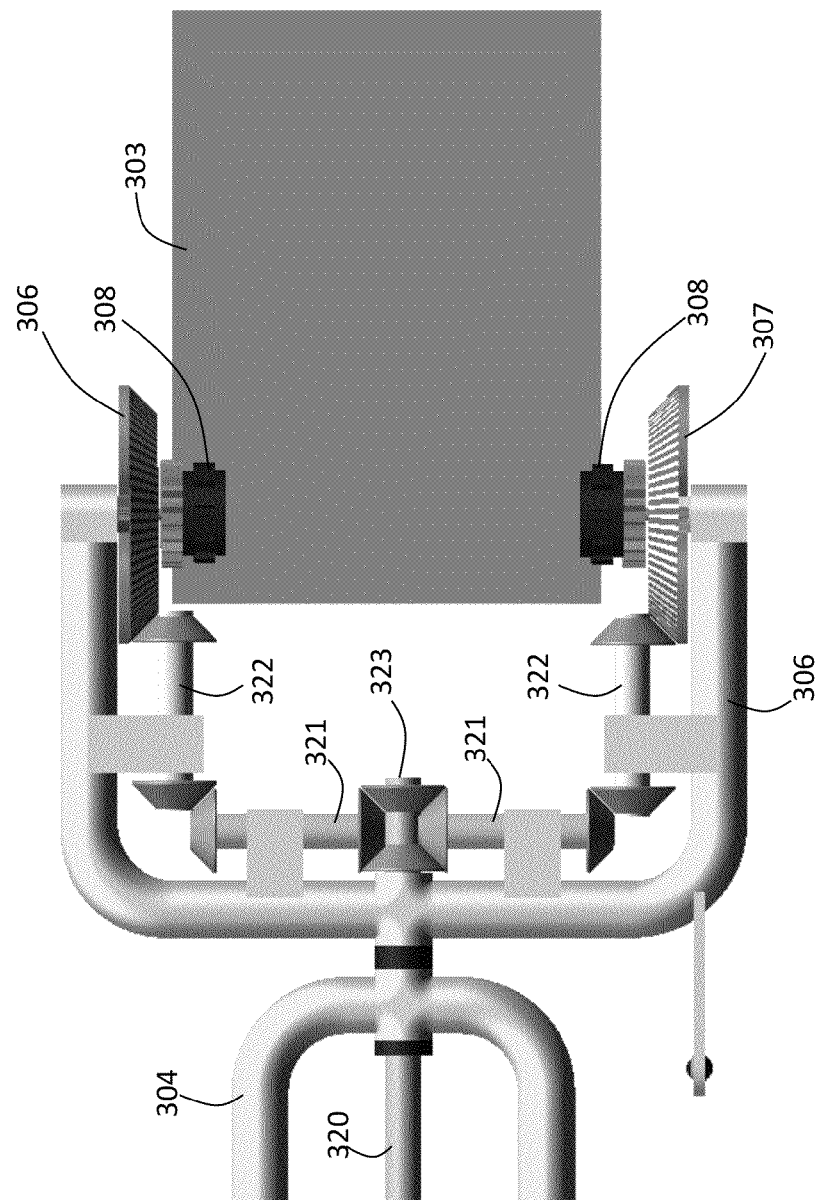
FIG. 3B depicts a top view of a wing drive assembly and wing according to an embodiment of the present invention.

With reference to FIG. 3B, a detailed top view of wing drive assembly 302 and wing 303 is shown. Front cross member gear 320 extends from front cross member 304 and through wing holding frame 306 to engage gear structure 323 disposed on the wing holding frame 306. Front cross member gear 320 engages first gears 321 of gear structure 323, extending in both directions along a longitudinal side of U-shaped wing holding frame 306. First gears 321, in turn, engage second gears 322 of gear structure 323, extending along opposing transverse sides of U-shaped wing holding frame 306. Second gears 322 engage drive discs 307 disposed on opposing sides of U-shaped wing holding frame 306.

Figure 3D:
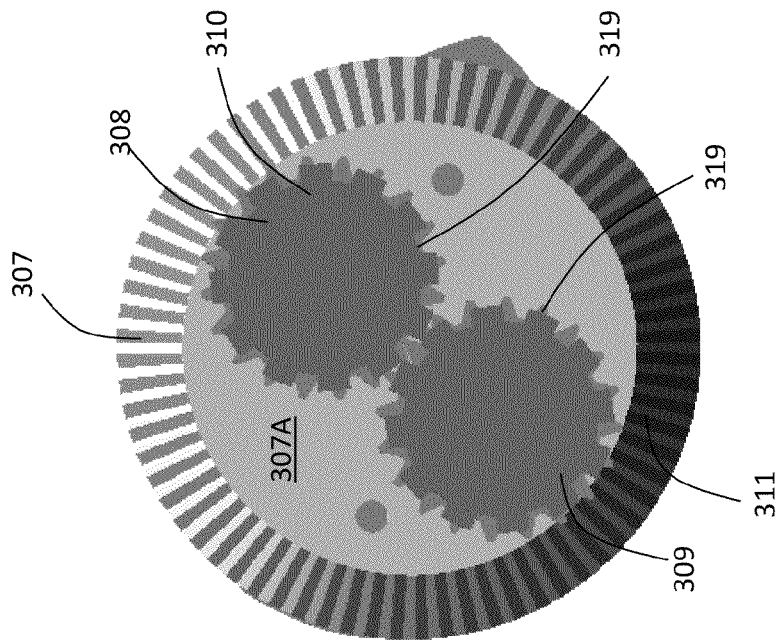
FIG. 3D depicts a side view of a proximal surface of a drive disc according to an embodiment of the present invention.
Figure 3C:
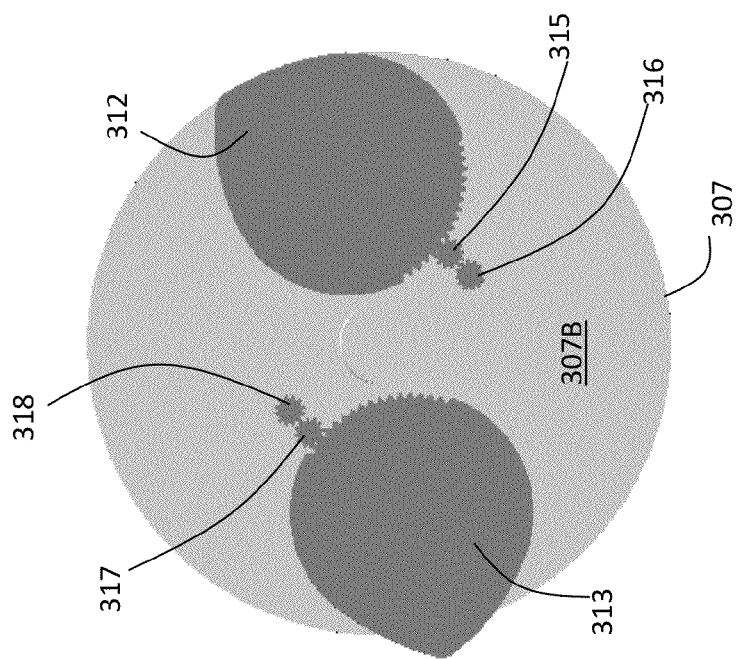
FIG. 3C depicts a side view of a distal surface of a drive disc according to an embodiment of the present invention.

With reference to FIG. 3C, a side view of drive disc 307 is shown facing a distal surface 307B of drive disc 307. Disposed on distal surface 307D of drive disc 307 are first 312 and second 313 cam mechanisms. First 312 and second 313 cam mechanisms engage first 315 and second 317 reversing gears disposed on distal surface 307B of drive disc 307. First 315 and second 317 reversing gears in turn engage first 316 and second 318 inversion drive gears disposed on distal surface 307B of drive disc 307.

With reference to FIG. 3D, a side view of drive disc 307 is shown facing a proximal surface 307A of drive disc 307. Disposed on proximal surface 307A of drive disc 307 are first 310 and second 311 inversion gears. First 310 and second 311 inversion gears are disposed proximate to each other on proximal surface 307A of drive disc 307 so as to engage each other. Disposed on first 310 and second 311 drive gears are first 308 and second 309 wing inversion discs, respectively.

In an alternate embodiment, first 308 and second 309 wing inversion discs are provided with a plurality of teeth 319 about their circumferences. Teeth 319 engage teeth (not shown) disposed on surface of wing 303 so as to prevent slippage of wing 303 with respect to first 308 and second 309 wing inversion discs as the wing 303 engages in the reciprocating motion.

As can be seen in FIGS. 3E-3H, wing 303 is attached to wing holding frame 306 by being disposed between and engaging first 308 and second 309 wing inversion discs on proximal surface 307A of drive disc 307.

Figure 3E:
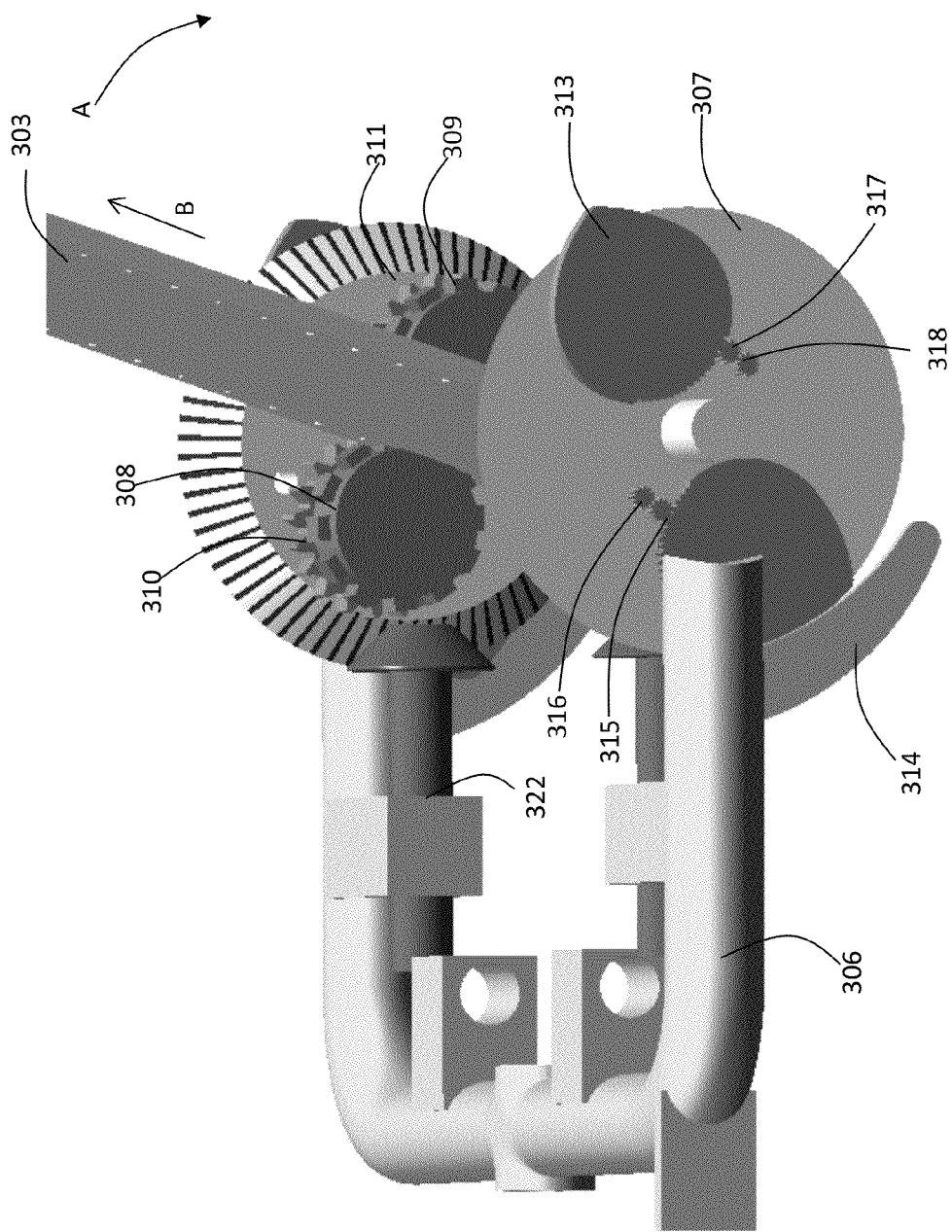
FIG. 3E depicts a detailed perspective view of a wing drive assembly and wing, with the wing in a raised orientation, according to an embodiment of the present invention.

With reference to FIG. 3E, a detailed perspective view of wing drive assembly 302 and wing 303 is shown. Wing 303 is in a raised orientation and beginning to engage in a downward arcuate motion as indicated by arrow A. Wing 303 is disposed between and engages first 308 and second 309 wing inversion discs on drive discs 307, which are disposed on opposing transverse sides of U-shaped wing holding frame 306.

Drive discs 307 are engaged by second gears 322 so as to constantly rotate in a rotational direction. As drive discs 307 rotate, first 312 and second 313 cam mechanisms alternately engage cam tracks 314 disposed on opposing sides of U-shaped wing holding frame 306.

As shown in FIG. 3E, first cam mechanisms 312 engage cam tracks 312 so as to cause first cam mechanisms 312 to rotate in a rotational direction opposite to the rotational direction of drive discs 307. As first cam mechanisms 312 rotate, they actuate first reversing gears 315 to rotate in the same rotational direction as drive discs 307. First reversing gears 315, in turn, actuate first inversion drive gears 316 to rotate in the rotational direction opposite the rotational direction of drive discs 307. First inversion drive gears 316 share an axis of rotation with first inversion gears 310 such that first inversion gears 310 rotate in the same rotational direction as first inversion drive gears 316.

First wing inversion discs 308 rotate along with first inversion gears 310 in a rotational direction opposite the rotational direction of drive discs 307. As first inversion gears 310 rotate, they engage second inversion gears 311 to rotate in the same rotational direction as drive discs 307. Second wing inversion discs 309 are thereby caused to rotate in the same rotational direction as drive discs 307. Wing 303 is driven in an indexing motion parallel to the opposing long sides of wing 303 by the opposing rotations of first 308 and second 309 wing inversion discs, as indicated by arrow B. This indexing motion drives wing 303 to a fully extended position with respect to body 301 during the downward arcuate motion.

Rotation of second wing inversion gears 311 also causes second cam mechanisms 313 to be reset into a position for engaging cam tracks 314 through the engagement between second wing inversion gears 311, second inversion drive gears 318, second reversing gears 317, and second cam mechanisms 313 in a reversal of the actuation of first wing inversion gears 310 by first cam mechanisms 312 discussed above.

Figure 3F:
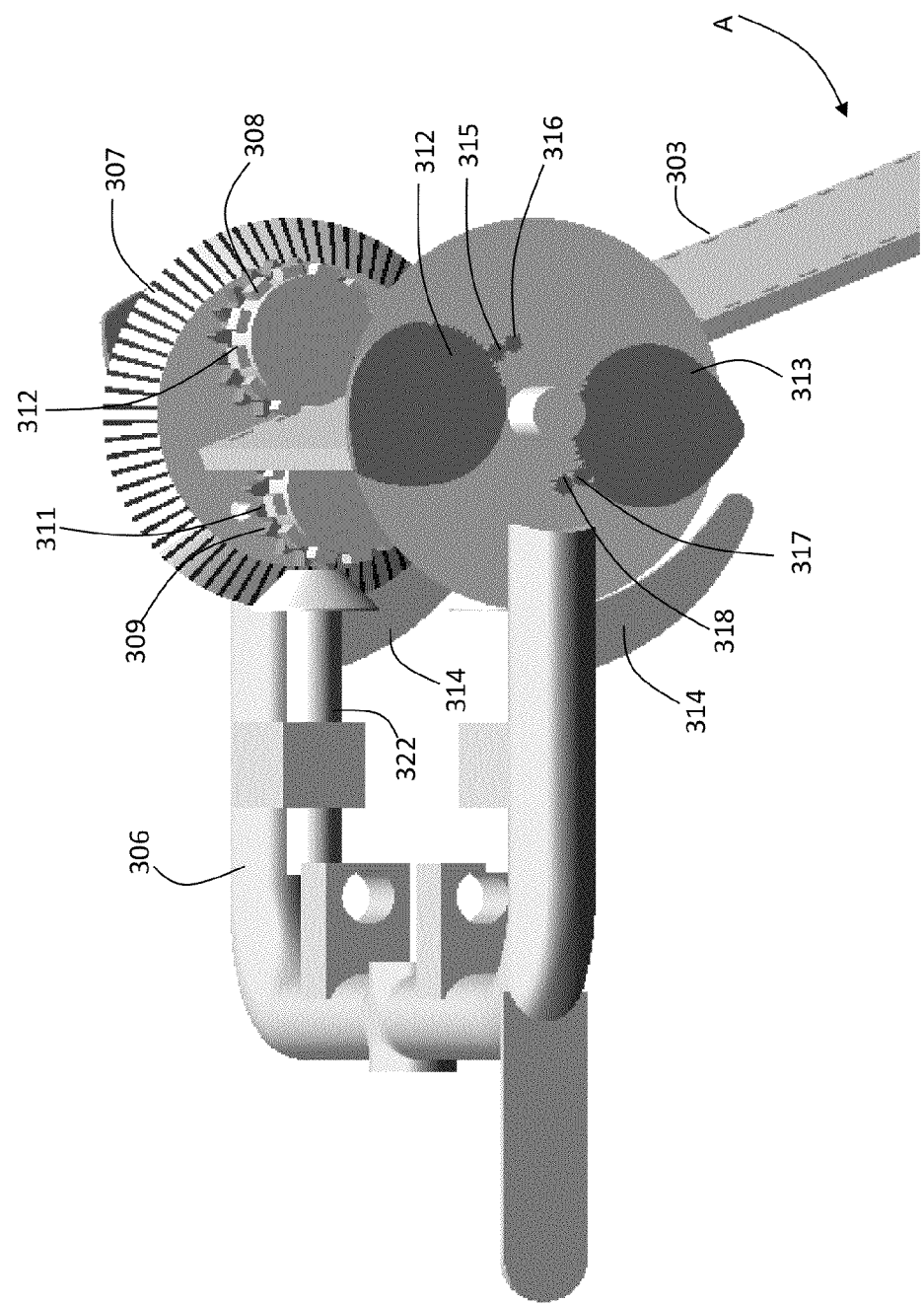
FIG. 3F depicts a detailed perspective view of a wing drive assembly and wing, with the wing approaching a lowered orientation, according to an embodiment of the present invention.

With reference to FIG. 3F, a detailed perspective view of wing drive assembly 302 and wing 303 is shown. Wing 303 has substantially passed through the downward arcuate motion indicated by arrow A and progressed toward a lowered orientation. As can be appreciated from FIG. 3F, rotation of drive discs 307 drives the downward arcuate motion of wing 303 via first 308 and second 309 wing inversion discs. During the downward arcuate motion, first 312 and second 313 cam mechanisms have not engaged cam tracks 314 such that wing 303 has not been indexed from a fully extended position.

Second cam mechanisms 313 are arranged on drive discs 307 so as to engage cam tracks 314 and drive wing 303 in an upward indexing motion prior to wing 303 coming to a lowered vertical orientation. This arrangement allows for a smoother transition of the movement of wing 303 between alternating upward indexing motions and downward arcuate motions, thus reducing an inertial disruption caused by the reciprocating motion of wings 303.

Figure 3G:
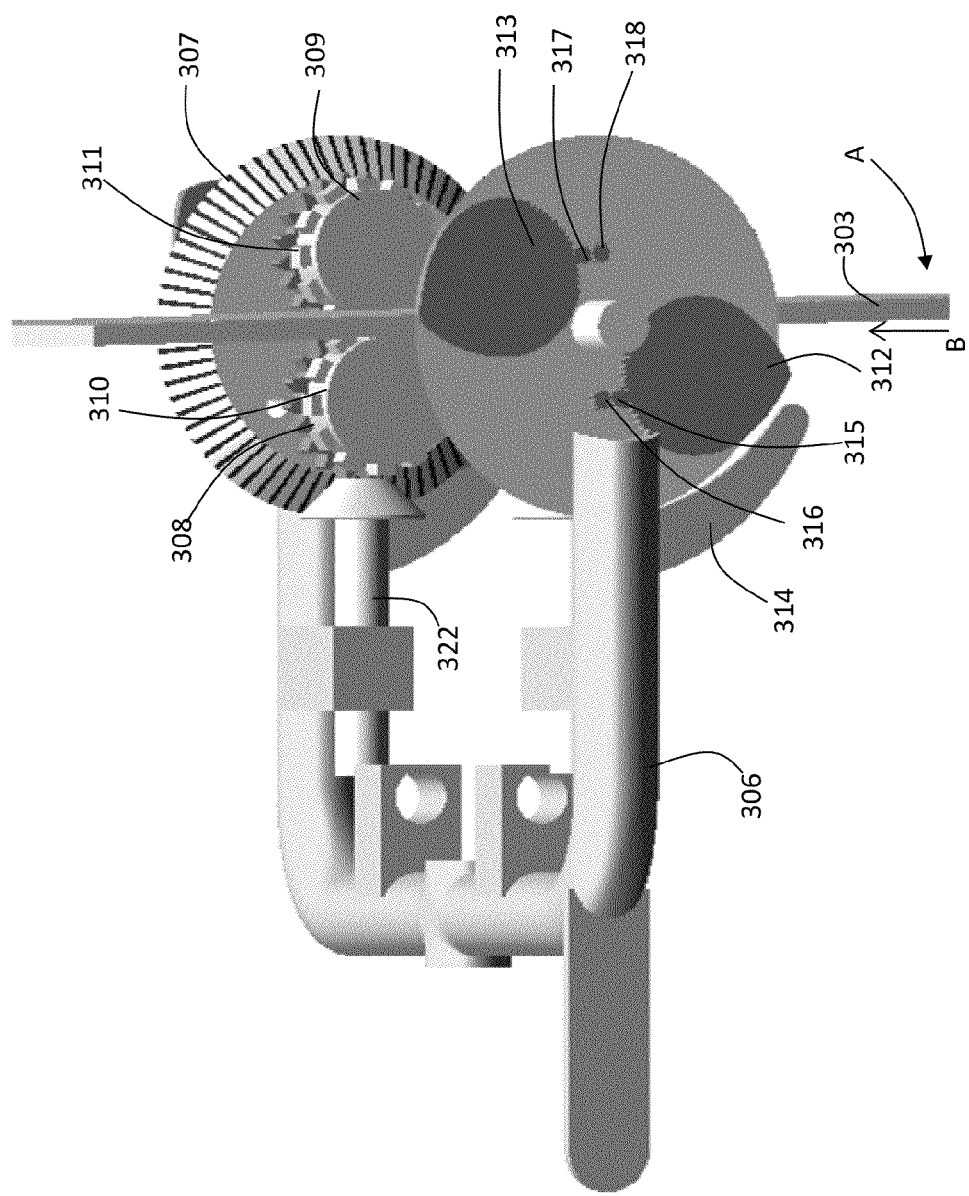
FIG. 3G depicts a detailed perspective view of a wing drive assembly and wing, with the wing transitioning from a lowered orientation to a raised orientation in an indexed upward motion, according to an embodiment of the present invention.

With reference to FIG. 3G, a detailed perspective view of wing drive assembly 302 and wing 303 is shown. Wing 303 has nearly completely passed through the downward arcuate motion indicated by arrow A. First 312 and second 313 cam mechanisms have engaged cam tracks 314 in turn so as to drive wing 303 in a series of upward indexing motions indicated by arrow B before wing 303 has reached a vertical lowered position.

As first 312 and second 313 cam mechanisms engage cam tracks 314, they actuate first 310 and second 311 inversion gears respectively to cause first 308 and second 309 wing inversion discs to engage in opposing rotations and index wing 303 upward, as discussed above. As one of first 312 and second 313 cam mechanisms engage cam tracks 314 the other of first 312 and second 313 cam mechanisms is reset as discussed above.

Figure 3H:
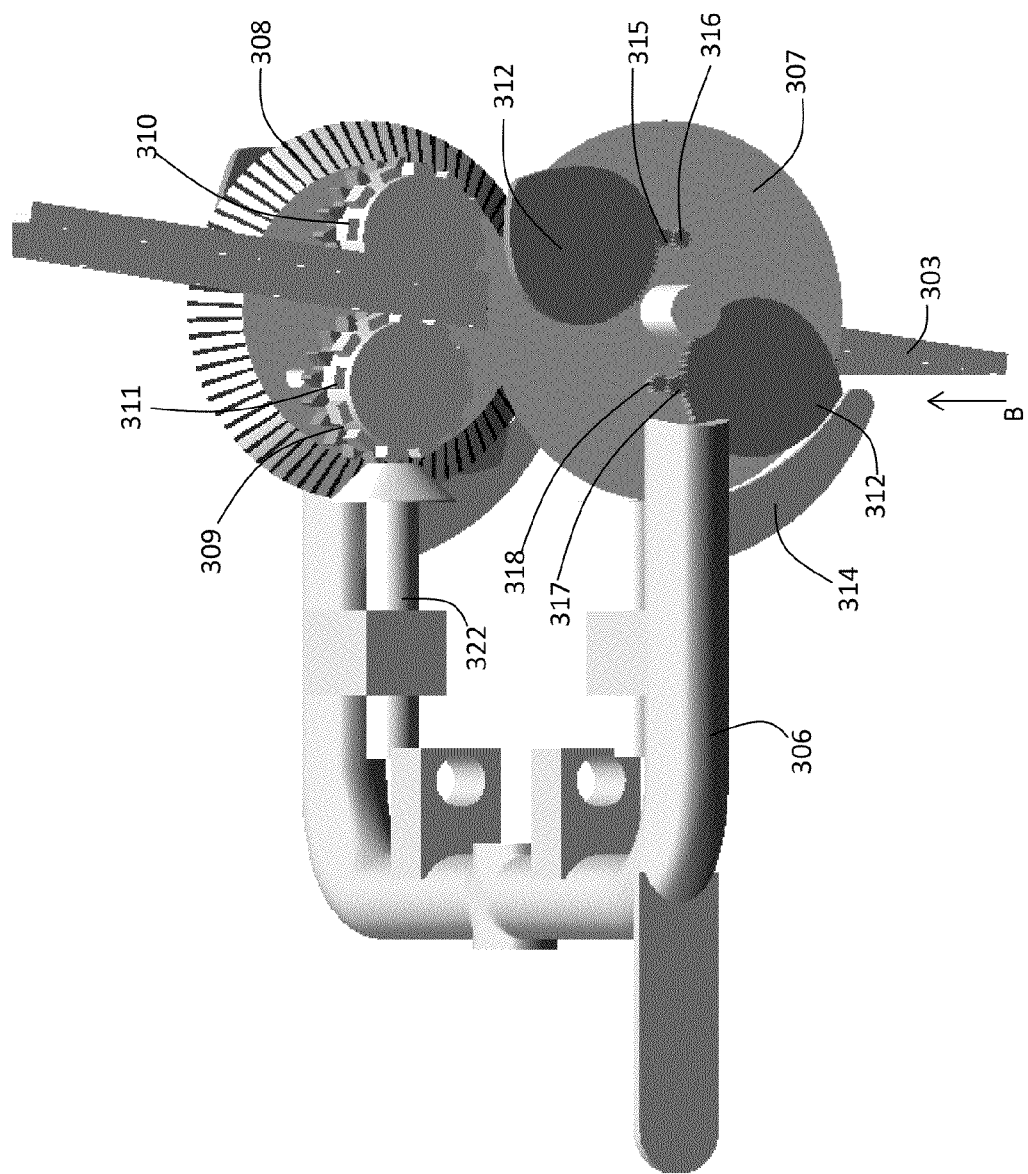
FIG. 3H depicts a detailed perspective view of a wing drive assembly and wing, with the wing in a substantially vertical orientation and transitioning from a lowered orientation to a raised orientation in an indexed upward motion, according to an embodiment of the present invention.

With reference to FIG. 3H, a detailed perspective view of wing drive assembly 302 and wing 303 is shown. Wing 303 has completed the downward arcuate motion and is driven in an upward indexed motion indicated by arrow B, as discussed above. The opposing rotations of first 308 and second 309 wing inversion discs keep wing 303 in a substantially vertical orientation even as drive discs 307 are constantly rotate until wing 303 returns to the raised orientation depicted in FIG. 3F and begins another downward arcuate motion.

With reference to FIGS. 3F-3H, it can be appreciated that the rotation of drive discs 307 drives wing 303 in a downward arcuate motion indicated by arrow A, with wing 303 fully extended across a substantially entire length of wing 303, so as to generate an upward thrust. As first 312 and second 313 cam mechanisms engage cam tracks 314 they cause wing 303 to be driven in an upward indexing motion by the opposing rotations of first 308 and second 309 wing inversion discs as indicated by arrow B. The upward indexing motion also causes wing 303 to become retracted with respect to body 301. This upward indexing motion retains wing 303 in a substantially vertical orientation so as to generate almost zero or negligible downward thrust.

As can be appreciated from FIGS. 3E-3H, wing 303 fully inverts during the reciprocating motion as wing 303 is alternately driven through downward arcuate motions and upward indexed motions.

Figure 4:
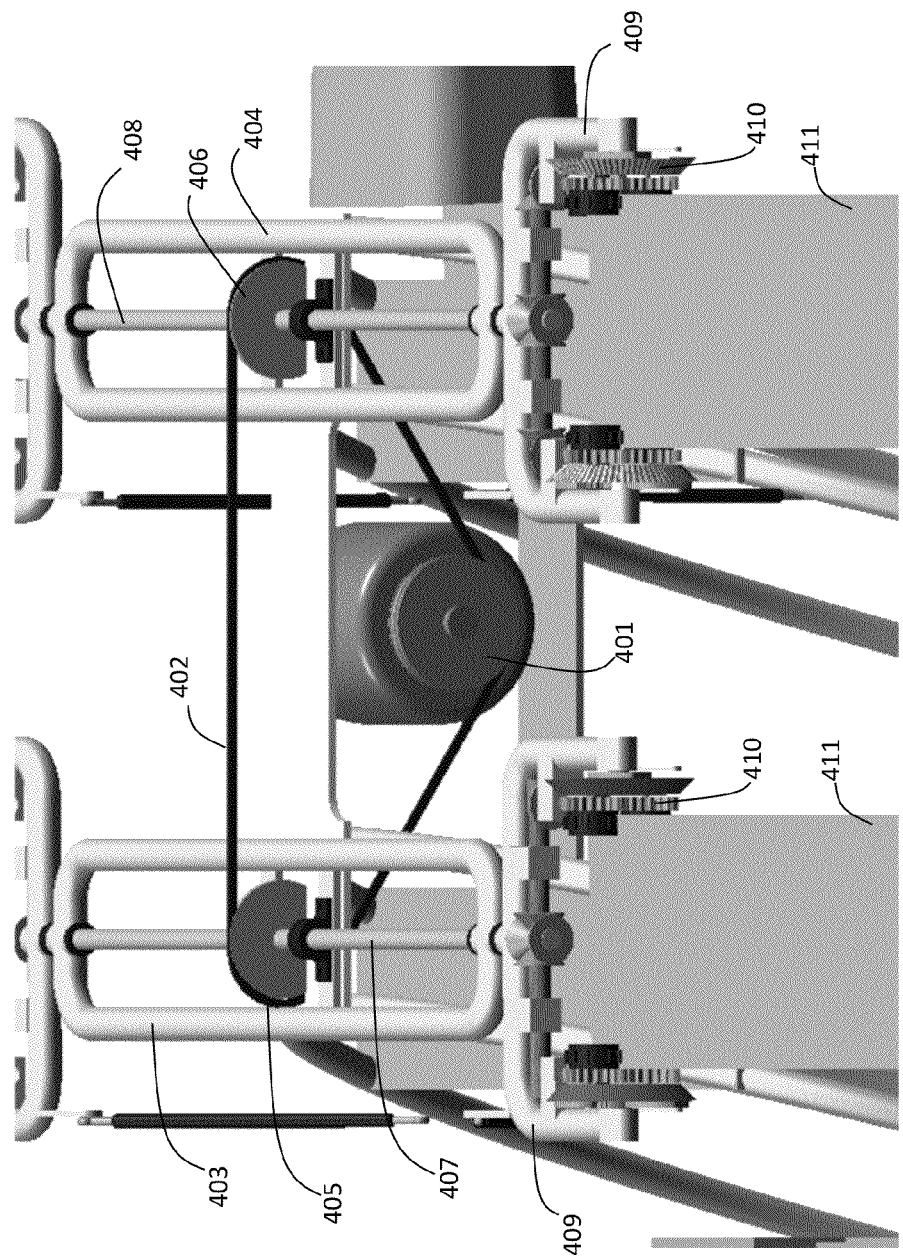
FIG. 4 depicts a perspective view of a wing drive assembly according to an embodiment of the present invention.

With reference to FIG. 4, a perspective view of a wing drive assembly 400, according to an embodiment of the present invention, is shown. It is to be understood that the wing drive assembly 400, described with reference to FIG. 4, may be used in any one of the above-detailed embodiments.

A motor 401 of wing drive assembly 400 is disposed in a vehicle body proximate to a top side thereof. Motor 401 is an electric motor suitable for actuating wings 411 to engage in a reciprocating motion.

Front 403 and rear 404 cross members are disposed on the top side of the vehicle body. Front 407 and rear 408 cross member gears are disposed within front 403 and rear 404 cross members, respectively, and co-extend therewith. Front 405 and rear 406 drive pulleys are disposed on front 407 and rear 408 cross member gears, respectively. A belt 402 is disposed around the spindle of motor 401, as well as front 405 and rear 406 drive pulleys. Belt 402 is driven by motor 401 so as to cause front 405 and rear 406 drive pulleys and, thus, front 407 and rear 408 cross member gears to rotate in a rotational direction.

Front 407 and rear 408 cross member gears extend from front 403 and rear 404 cross members and through wing holding frames 409 so as to engage wing actuation assemblies 410 disposed on each wing holding frame 409. As front 407 and rear 408 cross member gears rotate, they actuate wing actuation assemblies to drive wings 411 in a reciprocating motion, as discussed above with respect to any one of the above-detailed embodiments.

Figure 5A:
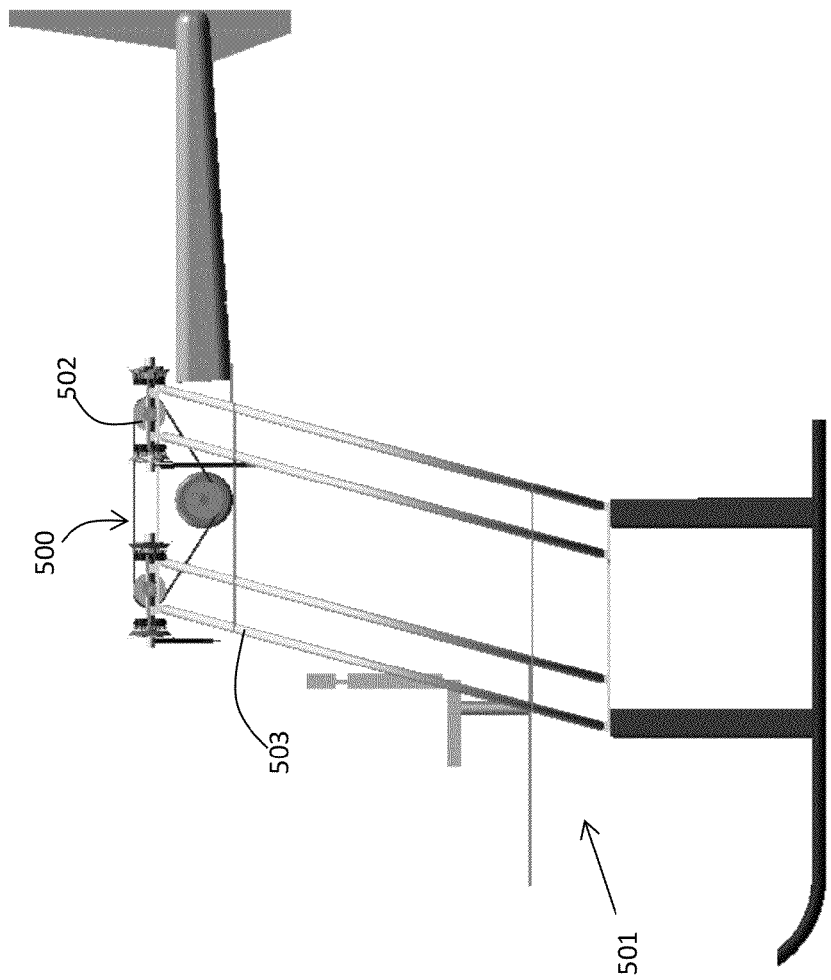
FIG. 5A depicts a side view of a body with an inverting wing propulsion system according to an embodiment of the present invention with the wings in a non-angled orientation with respect to the body.

FIGS. 5A-5D depict alternate embodiments of an inverting wing propulsion system 500 according to the present invention. It is to be understood that the embodiments of FIGS. 5A-5D are compatible with any one of the above-detailed embodiments. With reference to FIG. 5A, a side view of inverting wing propulsion system 500 is shown. A vehicle body 501 is provided with a wing drive assembly 502 for actuating wings 503 to engage in a reciprocating motion. As shown in FIG. 5A, wings 503 are not angled with respect to body 501 so as to generate only an upward thrust.

Figure 5B:
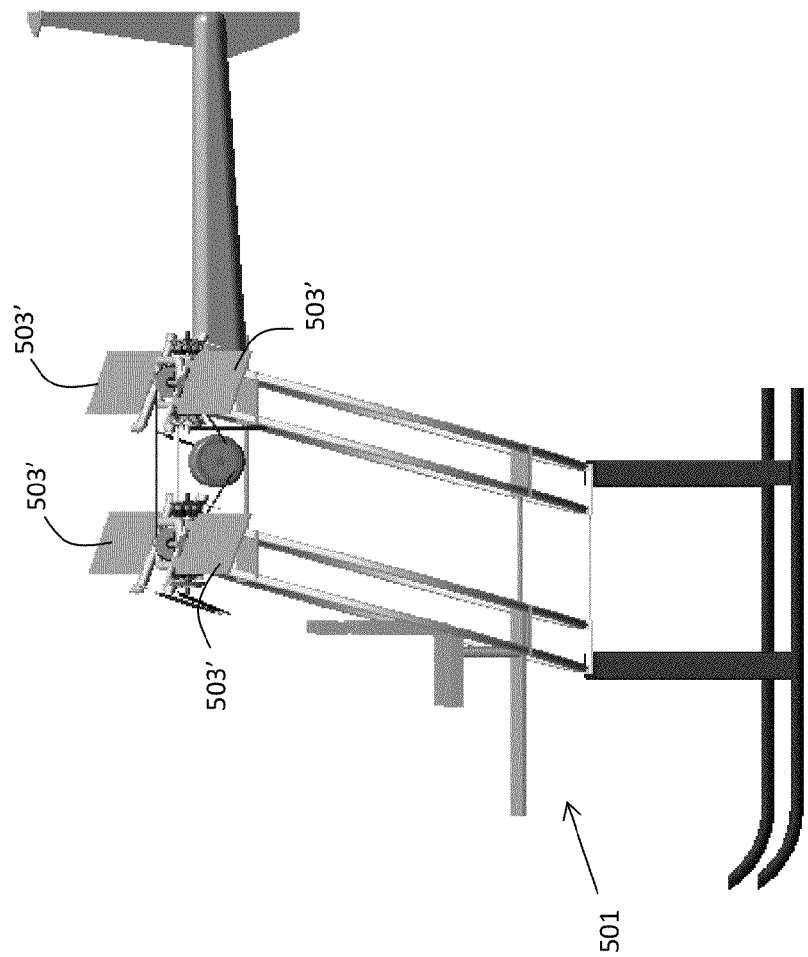
FIG. 5B depicts a perspective view of a body with an inverting wing propulsion system according to an embodiment of the present invention with the wings angled toward the rear of the body.

As shown in FIG. 5B, in a perspective view of an alternate embodiment of the present invention, wings 503' are angled toward a rear side of body 501 so as to generate both an upward thrust and a rearward thrust when engaging in a reciprocating motion.

Figure 5C:
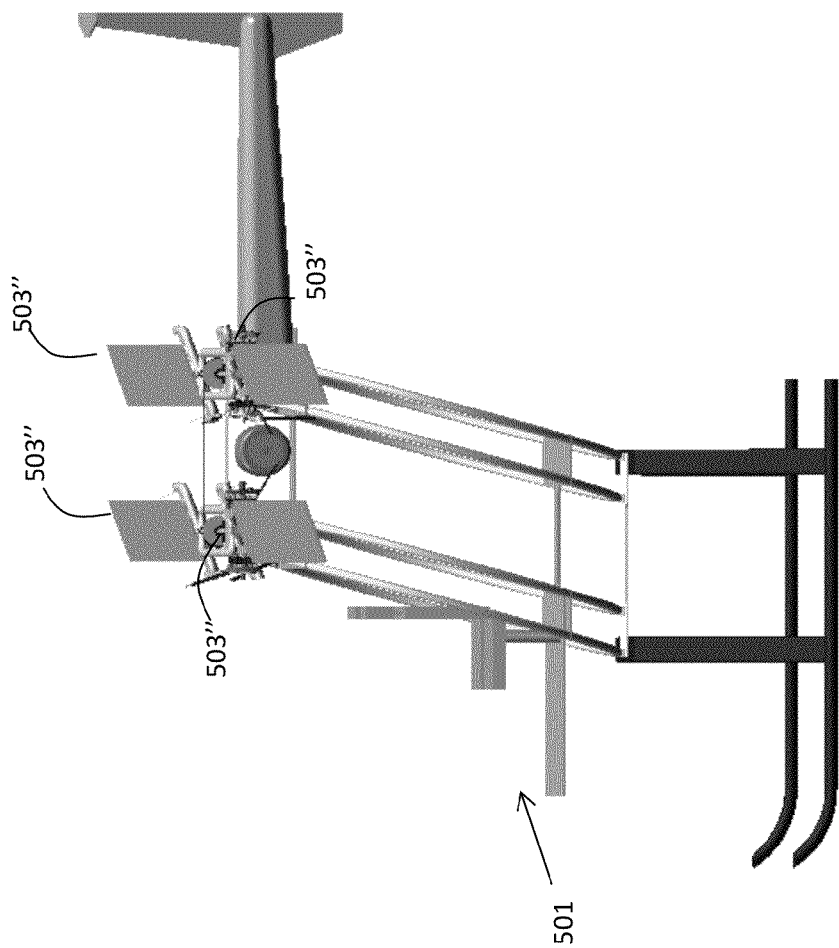
FIG. 5C depicts a perspective view of a body with an inverting wing propulsion system according to an embodiment of the present invention with the wings angled toward the front of the body.

As shown in FIG. 5C, in a perspective view of an alternate embodiment of the present invention, wings 503" are angled toward a front side of body 501 so as to generate both an upward thrust and a forward thrust when engaging in a reciprocating motion.

Figure 5D:
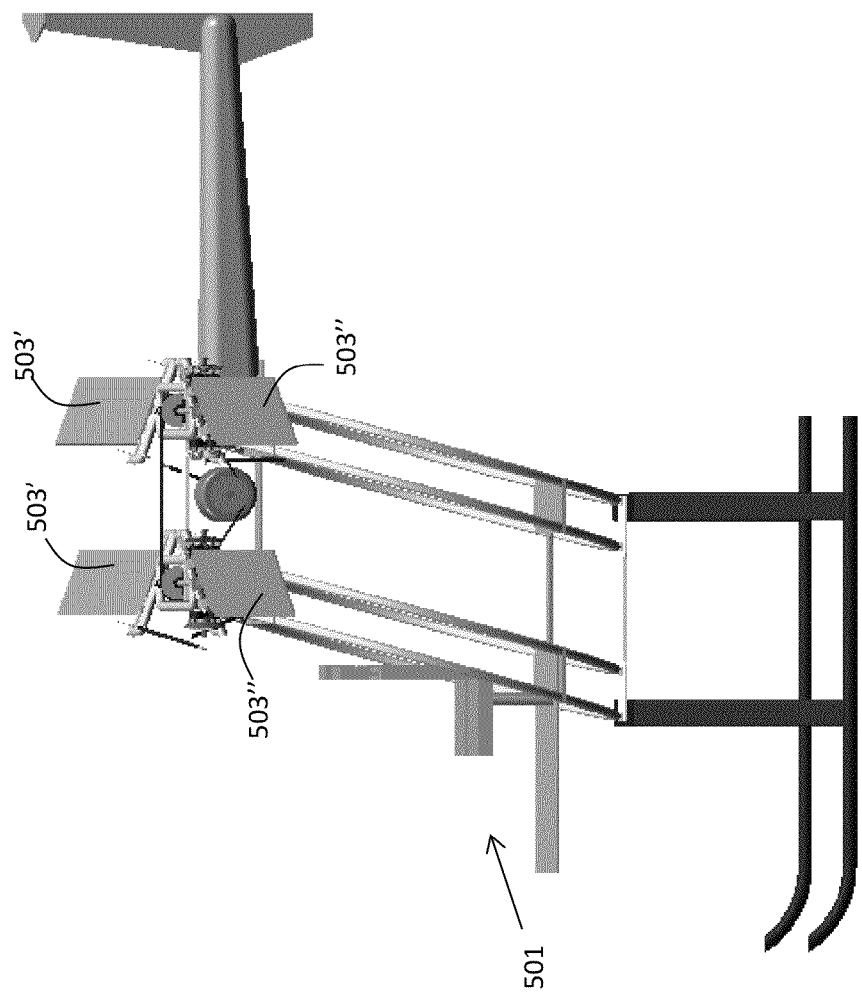
FIG. 5D depicts a perspective view of a body with an inverting wing propulsion system according to an embodiment of the present invention with two wings angled toward the front of the body and two wings angled toward the rear of the body.

As shown in FIG. 5D, in a perspective view of an alternate embodiment of the present invention, wings 503' are disposed on a left side of body 501 and are angled toward a rear side of a body 501 so as to generate upward and rearward thrusts. Wings 503" are disposed on a right side of body 501 and are angled toward a front side of body 501 so as to generate upward and forward thrusts.

Figure 6A:
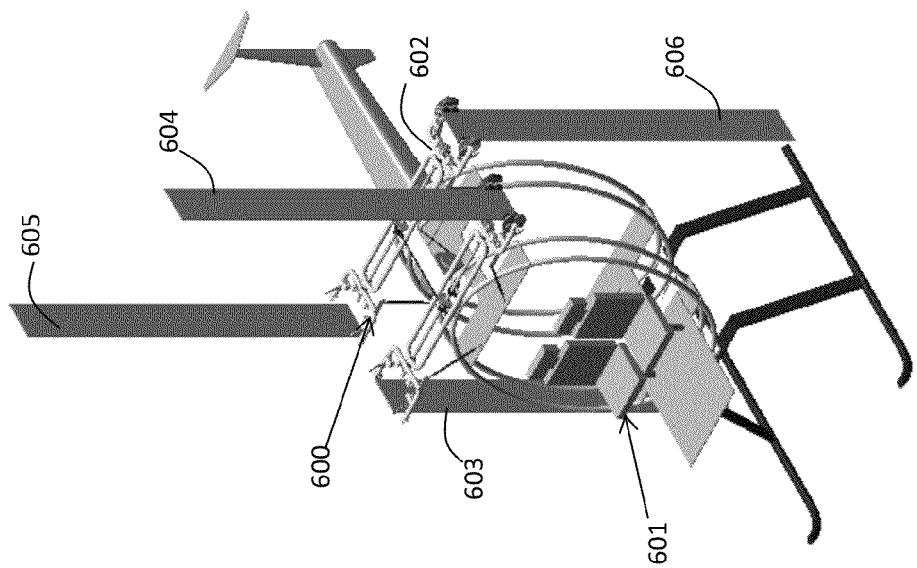
FIGS. 6A-6F depict perspective views of a body having an inverting wing propulsion system according to an embodiment of the present invention with the wings being driven through a reciprocating motion in a staggered manner.

FIGS. 6A-6F depict a series of perspective views of an embodiment of an inverting wing propulsion system 600 according to the present invention and the progression of the reciprocating motion of wings 603, 604, 605 and 606. It is to be understood that the embodiment of FIGS. 6A-6F is compatible with any one of the above-detailed embodiments. As shown in FIG. 6A, a vehicle body 601 is provided with a wing drive assembly 602 for actuating wings 603, 604, 605 and 606 to engage in a synchronized reciprocating motion between a raised orientation and a lowered orientation.

The respective synchronized reciprocating motions of wings 603, 604, 605 and 606 are staggered such that as front right 604 and rear left 605 wings are engaging in a downward arcuate motion, front left 603 and rear right 606 wings are engaging in an upward vertical motion and vice versa. This staggering of wings 603, 604, 605 and 606 reduces the vibrations and inertial disruptions caused by the reciprocating motion of the wings since the wings counteract each other.

Figure 6B:
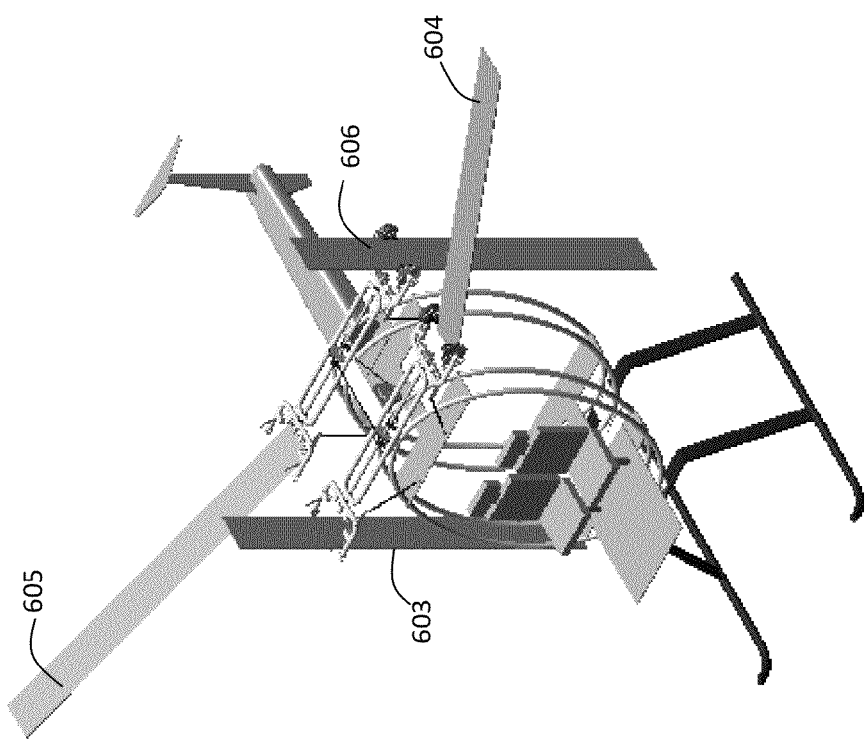
Figure 6C:
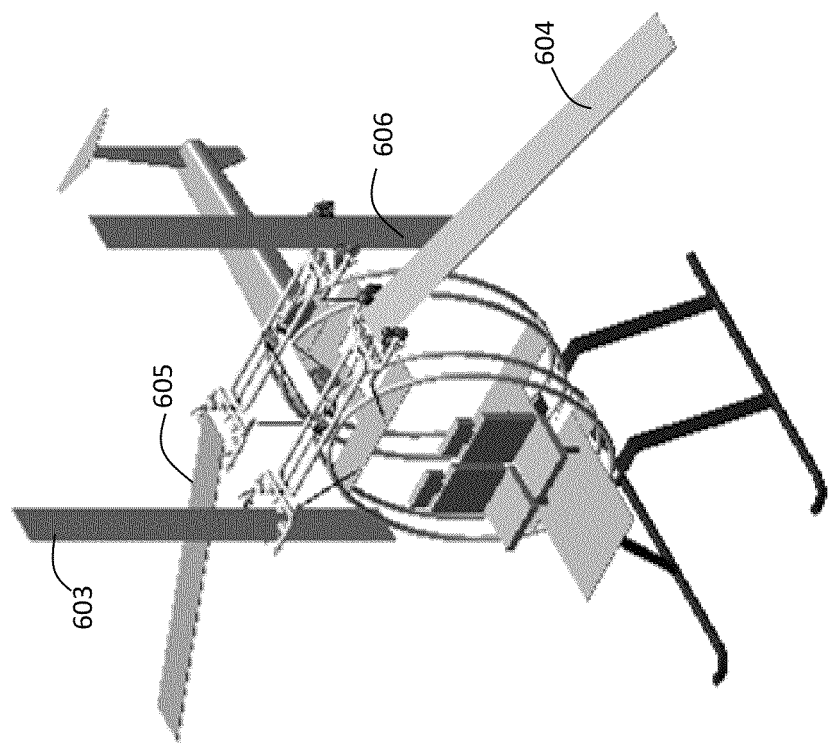

In FIG. 6A, front left 603 and rear right 606 wings are in a lowered orientation and front right 604 and rear left 605 wings are in a raised orientation. In FIG. 6B, front left 603 and rear right 606 wings are engaged in an upward vertical motion and front right 604 and rear left 605 wings are engaged in a downward arcuate motion. In FIG. 6C, the upward vertical motions of front left 603 and rear right 606 wings and the downward arcuate motions of front right 604 and rear left 605 wings are near completion.

Figure 6D:
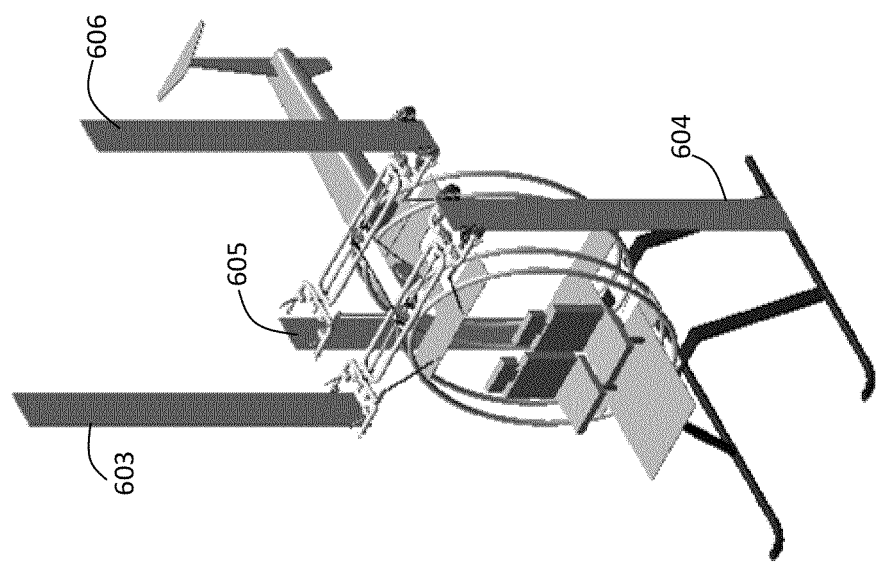
Figure 6E:
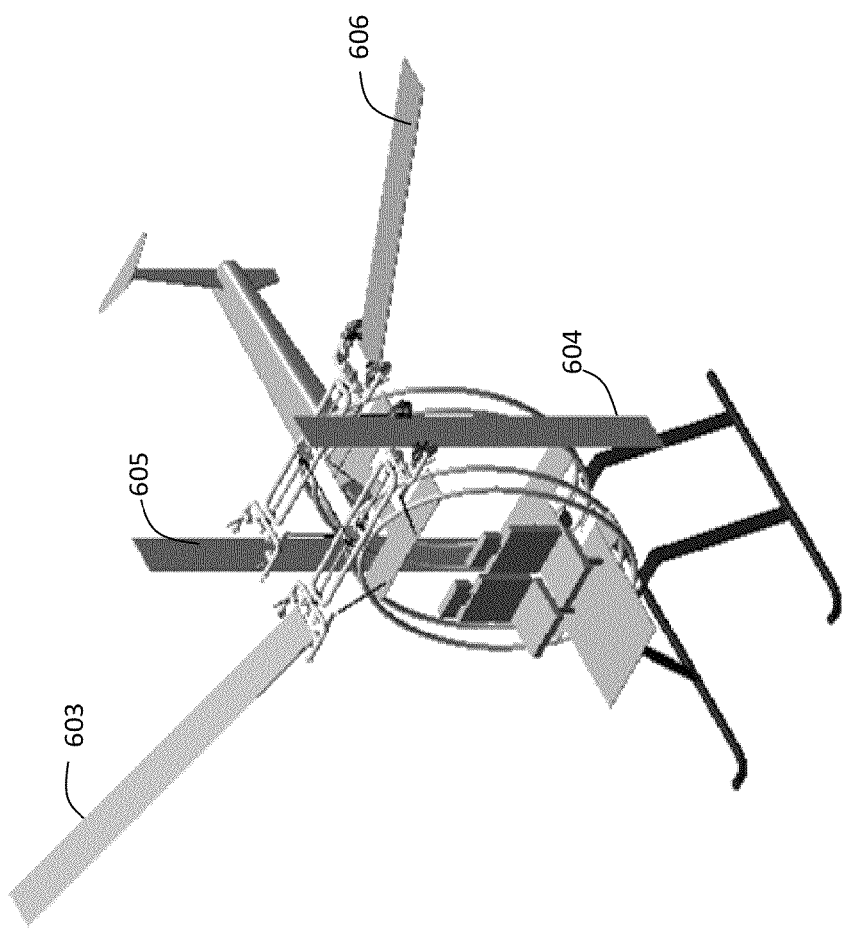
Figure 6F:
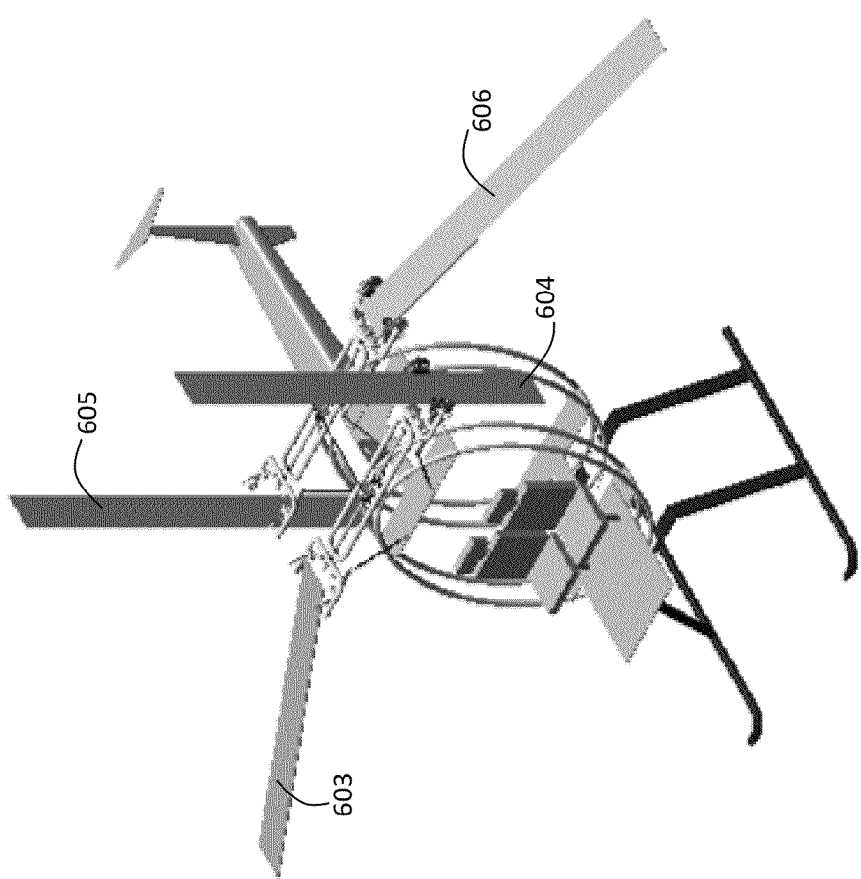

In FIG. 6D, front left 603 and rear right 606 wings are in a raised orientation and front right 604 and rear left 605 wings are in a lowered orientation. In FIG. 6E, front left 603 and rear right 606 wings are engaged in a downward arcuate motion and front right 604 and rear left 605 wings are engaged in an upward vertical motion. In FIG. 6F, the downward arcuate motions of front left 603 and rear right 606 wings and the upward vertical motions of front right 604 and rear left 605 wings are near completion as wings 603, 604, 605 and 606 return to the state shown in FIG. 6A.

In an alternative embodiment of the present invention, a body is provided with pivot axes on either side. A fuselage of the body extends to house both pivot axes. Many wings are disposed on each pivot axis. The wings are actuated so as to individually engage in a 180° downward arcuate motion while extending outside the fuselage in order to generate an upward thrust. The wings return to a raised orientation incrementally, such that there are many wings on each pivot axis engaging in an upward motion while retracted into the fuselage.

In an alternative embodiment of the present invention, a body is provided with pivot axes and curved housings on either side. The axes are disposed on the body proximal to the curved housings. The wings are articulated or flexible such that during a downward arcuate motion the wings fully extend from the body so as to generate an upward thrust and during an upward motion the wings bend against the housings so as to generate a reduced downward thrust.

In a final alternative embodiment, a body is provided with drive discs on either side. The drive discs are disposed within a fuselage of the body. One or more wings are disposed eccentrically on each drive disc and protrude through the fuselage at a joint. As the drive discs are rotated, the wings are extended from the fuselage to engage in a downward arcuate motion. During an upward motion, the wings are retracted into the fuselage by rotation of the drive discs so as to generate a reduced upward thrust. The wings are rotatatably connected to the drive discs and the joints act as fulcrums for the wings such that the wings undergo a reciprocating motion characterized by a "flapping" motion rather than an inverting motion.

While several embodiments of a reciprocating or inverting wing propulsion system were described in the foregoing detailed description, those skilled in the art may make modifications and alterations to these embodiments without departing from the scope and spirit of the invention. Accordingly, the foregoing description is intended to be illustrative rather than restrictive. The invention described hereinabove is defined by the appended claims and all changes to the invention that fall within the meaning and the range of equivalency of the claims are embraced within their scope.

The invention claimed is:

1. An inverting wing propulsion system for a body, said body having a right side and a left side, said inverting wing propulsion system comprising:

a wing drive assembly associated with said body; and
at least two wings operatively associated with said wing drive assembly, at least one wing extending from each of said right side and said left side of said body,
wherein said wings are adapted to be driven by said wing drive assembly to engage in a reciprocating motion between a raised orientation and a lowered orientation,
wherein said reciprocating motion is characterized by a downward arcuate motion, during which said wings fully extend from said body so as to generate an upward thrust, and by an upward vertical motion, during which said wings are retracted,
wherein said wings fully invert during said reciprocating motion;
wherein said at least two wings each comprise a tubular structure having two opposing long flat sides and two opposing short rounded sides;
wherein said body further comprises a top side and at least one cross member disposed on said top side, said at least one cross member extending from said left side to said right side of said body and having a left end and a right end,
wherein said wing drive assembly comprises:
a motor disposed in said body;
a cross member gear disposed within said at least one cross member, said cross member gear being adapted to be driven by said motor; and
wing holding frames attached to each of said right end and said left end of said at least one cross member, each of said wing holding frames comprising:
a gear structure disposed on said wing holding frame, said gear structure being adapted to be driven by said motor via said cross member gear;
a drive roller disposed on said wing holding frame, said drive roller being adapted to be driven in a rotational direction by said motor via said cross member gear and said gear structure; and
a wing roller disposed on said wing holding frame proximate to said drive roller, said wing roller being adapted to be driven in a rotational direction opposite to the rotational direction of said drive roller,
wherein said wing roller passes through one of said at least two tubular wings such that said tubular wing is attached to said wing holding frame by being disposed between and engaging said drive roller and said wing roller, and
wherein said tubular wing is driven to engage in said reciprocating motion by the opposing rotations of said drive roller and said wing roller.

2. The inverting wing propulsion system of claim 1, wherein said wings have a symmetrical shape.

3. The inverting wing propulsion system of claim 1, wherein said at least two wings are synchronized such that said at least one wing extending from said right side of said body and said at least one wing extending from said left side of said body engage in said downward arcuate motion substantially simultaneously.

4. The inverting wing propulsion system of claim 1, wherein an inner surface of said tubular wing and an outer surface of said wing roller both comprise teeth, said teeth on said tubular wing and said teeth on said wing roller engaging each other to prevent slippage of said tubular wing with respect to said wing roller during said reciprocating motion.

5. The inverting wing propulsion system of claim 1, wherein said at least two wings each comprise:
a flat planar portion having two opposing long sides and two opposing short sides;
flange portions disposed on each of said two opposing long sides of said flat planar portion and co-extending therewith, said flange portions being oriented orthogonally to said flat planar portion, said flange portions each having two opposing long flat sides and two opposing short rounded sides defining a perimeter of each of said flange portions; and
channels disposed within each of said flange portions, said channels extending along an entire perimeter of said flange portions.

6. The inverting wing propulsion system of claim 5,
wherein said body further comprises a top side and at least one cross member disposed on said top side, said at least one cross member extending from said left side to said right side of said body and having a left end and a right end,
wherein said wing drive assembly comprises:
a motor disposed in said body;
a cross member gear disposed within said at least one cross member, said cross member gear being adapted to be driven by said motor; and
wing holding frames attached to each of said right end and said left end of said at least one cross member, each of said wing holding frames comprising:
a gear structure disposed on said wing holding frame, said gear structure being adapted to be driven by said motor via said cross member gear;
two drive pulleys disposed on opposing sides of said gear structure, said drive pulleys being adapted to be driven in a rotational direction by said motor via said cross member gear and said gear structure;
two upper guide pulleys disposed on said wing holding frame, each of said upper guide pulleys being associated with one of said drive pulleys;
two lower guide pulleys disposed on said wing holding frame, each of said lower guide pulleys being associated with one of said drive pulleys and being positioned on said wing holding frame proximate to one of said upper guide pulleys; and
two belts, each of said belts being disposed around one of said drive pulleys and around one of said flange portions of said wing within said channel,
each of said belts further engaging one of said upper guide pulleys and one of said lower guide pulleys,
wherein one of said at least two wings is attached to said wing holding frame proximate to said upper and lower guide pulleys by said belts, and
wherein said belts are driven in said rotational direction by said drive pulleys and guided by said upper and lower guide pulleys so as to drive said wing in said reciprocating motion.

7. The inverting wing propulsion system of claim 6,
wherein outer surfaces of said drive pulleys, inner surfaces of said belts, and bottom surfaces of said channels disposed within said flange portions of said wing all comprise teeth, said teeth on said outer surfaces of said drive pulleys and said inner surfaces of said belts engaging each other to prevent slippage of said belts with respect to said drive pulleys as said belts are being driven by said drive pulleys and said teeth on said inner surfaces of said belts and said bottom surfaces of said channels engaging each other to prevent slippage of said wing with respect to said belts during said reciprocating motion.

8. The inverting wing propulsion system of claim 1, wherein said at least two wings each comprise a flat planar structure having two opposing long sides and two opposing short sides.

9. The inverting wing propulsion system of claim 8,
wherein said body further comprises a top side and at least one cross member disposed on said top side, said at least one cross member extending from said left side to said right side of said body and having a left end and a right end,
wherein said wing drive assembly comprises:
a motor disposed in said body;
a cross member gear disposed within said at least one cross member, said cross member gear being adapted to be driven by said motor; and
wing holding frames attached to each of said right end and said left end of said at least one cross member, each of said wing holding frames comprising:
a gear structure disposed on said ling holding frame, said gear structure being adapted to be driven by said motor via said cross member gear;
two drive discs disposed on opposing sides of said wing holding frame, said drive discs being adapted to be driven in a rotational direction by said motor via said cross member gear and said gear structure, each of said drive discs comprising:
a proximal surface and a distal surface;
two inversion gears disposed on said proximal surface of said drive disc,
said inversion gears being adapted to engage one another such that said inversion gears rotate in opposing rotational directions;
wing inversion discs disposed on each of said inversion gears such that said inversion gears are disposed between said inversion discs and said proximal surface of said drive disc; and
two cam mechanisms disposed on said distal surface of said drive disc,
each of said cam mechanisms being adapted to actuate said inversion gears to rotate in opposing rotational directions; and
cam tracks disposed on opposing sides of said wing holding frame, each of said cam tracks being adapted to engage said cam mechanism aid drive discs,
wherein one of said at least two wings is attached to said ling holding frame by being disposed between and engaging said wing inversion discs on each of said drive discs,
wherein said drive discs engage said wing via said wing inversion discs so as to drive said wing through said downward arcuate motion, and
wherein said wing inversion discs engage said wing so as to drive said wing through said upward vertical motion when said cam mechanisms engage said cam tracks and actuate said inversion gears to rotate in opposing rotational directions.

10. The inverting wing propulsion system of claim 9,
wherein circumferential surfaces of the wing inversion discs and an outer surface of said wing comprise teeth, said teeth on said circumferential surfaces of said wing inversion discs and said outer surface of said wing engaging each other to prevent slippage of said wing with respect to said wing inversion discs during said reciprocating motion.

11. The inverting wing propulsion system of claim 9, wherein said cam mechanisms are arranged on said distal surfaces of said drive discs so as to engage said cam tracks before aid downward arcuate motion of said wing is completed, whereby said wing is withdrawn from said fully extended position and driven in an indexed upward motion prior to reaching a vertical lowered orientation.

12. The inverting wing propulsion system of claim 1, comprising:
four wings operatively associated with said wing drive assembly, two wings extending from each of said right side and said left side of said body.

13. The inverting wing propulsion system of claim 12, wherein said four wings are staggered as they engage in a synchronized reciprocating motion such that as two wings are driven through said downward arcuate motion, two wings are driven through said upward vertical motion.

* * * * *